US006687878B1

(12) United States Patent
Eintracht et al.

(10) Patent No.: US 6,687,878 B1
(45) Date of Patent: Feb. 3, 2004

(54) SYNCHRONIZING/UPDATING LOCAL CLIENT NOTES WITH ANNOTATIONS PREVIOUSLY MADE BY OTHER CLIENTS IN A NOTES DATABASE

(75) Inventors: Zvika Eintracht, Ramat Gan (IL); Alexander Ovsiankin, Lod (IL); Roman Dementiev, Givatayim (IL); Gil Sideman, Raanana (IL)

(73) Assignee: Real Time Image Ltd., Or Yehuda (IL)

(*) Notice: Subject to any disclaimer, the term of this patent is extended or adjusted under 35 U.S.C. 154(b) by 0 days.

(21) Appl. No.: 09/270,255

(22) Filed: Mar. 15, 1999

(51) Int. Cl.$^7$ ................................................. G06F 7/00
(52) U.S. Cl. ................................... 715/512; 513/515
(58) Field of Search .......................... 707/501, 512, 707/513, 515; 715/501.1, 512, 513, 515

(56) References Cited

U.S. PATENT DOCUMENTS

| | | | | |
|---|---|---|---|---|
| 5,165,012 A | | 11/1992 | Crandall et al. ............. | 345/347 |
| 5,220,657 A | * | 6/1993 | Bly et al. ..................... | 711/152 |
| 5,231,578 A | | 7/1993 | Levin et al. ................. | 707/512 |
| 5,392,400 A | | 2/1995 | Berkowitz et al. ........... | 709/203 |
| 5,671,428 A | | 9/1997 | Muranaga et al. ........... | 345/329 |
| 5,806,079 A | | 9/1998 | Rivette et al. ............... | 707/512 |
| 5,821,931 A | | 10/1998 | Berquist et al. ............. | 345/346 |
| 5,831,615 A | * | 11/1998 | Drews et al. ................. | 345/344 |
| 5,832,474 A | * | 11/1998 | Lopresti et al. .............. | 707/2 |
| 5,838,914 A | | 11/1998 | Carleton et al. ............. | 709/204 |
| 5,845,301 A | * | 12/1998 | Rivette et al. ............... | 707/512 |
| 5,860,074 A | | 1/1999 | Rowe et al. ................. | 707/526 |
| 5,870,547 A | | 2/1999 | Pommier et al. ............ | 709/204 |
| 5,870,759 A | * | 2/1999 | Bauer et al. ................. | 707/201 |
| 5,890,177 A | * | 3/1999 | Moody et al. ............... | 715/511 |
| 5,966,512 A | * | 10/1999 | Bates et al. .................. | 709/205 |
| 6,052,514 A | * | 4/2000 | Gill et al. ..................... | 345/733 |
| 6,052,695 A | * | 4/2000 | Abe et al. ..................... | 707/202 |
| 6,081,291 A | * | 6/2000 | Ludwig, Jr. .................. | 348/16 |
| 6,081,829 A | * | 6/2000 | Sidana .......................... | 709/203 |

(List continued on next page.)

OTHER PUBLICATIONS

Trigg et al, "Supporting Collaboration in Notecards", Proceedings of the 1986 ACM conference on Computer–supported cooperative work, Dec. 1986, pp. 153–162.*

*Primary Examiner*—Stephen S. Hong
*Assistant Examiner*—Cesar B. Paula
(74) *Attorney, Agent, or Firm*—Howard Zaretsky

(57) ABSTRACT

A system for collaborative document annotation whereby notes (i.e. annotations) associated with a document, such as an image or text document, are stored in a notes database on a central notes server. The documents and associated annotations are treated independently from each other whereby separate data structures are created for the documents and for the associated annotations. A web server application on the server side functions to capture requests from one or more note client applications for creating, storing, editing and retrieving annotations related to specific documents stored on the notes server. On the client side, the notes client functions to display the document that the user wishes to annotate and provides the tools necessary to permit the user to create, edit, delete, retrieve and store notes. A synchronization process transmits the annotations generated by the user from the notes client to the notes server. In response, the notes server transmits back an acknowledgement along with any new notes that other notes clients may have posted since the last synchronization was performed thus enabling multiple notes clients to annotate a document asynchronously with respect to each other. When annotations are posted to the notes server by a notes client, the state of the annotation database is synchronized such that all other notes clients can retrieve the current, up to date annotations associated with a document.

96 Claims, 13 Drawing Sheets

U.S. PATENT DOCUMENTS

| | | | |
|---|---|---|---|
| 6,161,149 A * | 12/2000 | Achacoso et al. | 710/4 |
| 6,230,172 B1 * | 5/2001 | Purnaveja et al. | 707/512 |
| 6,240,444 B1 * | 5/2001 | Fin et al. | 709/205 |
| 6,308,199 B1 * | 10/2001 | Katsurabayashi | 709/204 |
| 6,336,134 B1 * | 1/2002 | Varma | 709/105 |
| 6,342,906 B1 * | 1/2002 | Kumar et al. | 345/751 |
| 6,353,851 B1 * | 3/2002 | Anupam et al. | 709/202 |
| 6,360,250 B1 * | 3/2002 | Anupam et al. | 709/204 |
| 6,493,731 B1 * | 12/2002 | Jones et al. | 715/501.1 |
| 6,507,845 B1 * | 1/2003 | Cohen et al. | 707/100 |
| 6,571,295 B1 * | 5/2003 | Sidana | 709/246 |
| 6,601,087 B1 * | 7/2003 | Zhu et al. | 709/205 |

* cited by examiner

SERVER ANNOTATION RESPONSE DATA STRUCTURE

SYNCHRONIZING/UPDATING LOCAL CLIENT NOTES WITH ANNOTATIONS PREVIOUSLY MADE BY OTHER CLIENTS IN A NOTES DATABASE

FIELD OF THE INVENTION

The present invention relates generally to collaborative work systems and more particularly relates to a system for collaborative document annotation based on the exchange of notes attached to web based documents, the system being suitable for use over a network such as the Internet based World Wide Web (WWW).

BACKGROUND OF THE INVENTION

A basic function of World Wide Web browsers in common use today, such as Netscape Navigator and Microsoft Internet Explorer, is to allow web pages stored in remote Web server to be retrieved and viewed. The user initiates a viewing session on a web browser by specifying a particular URL corresponding to a page to be viewed. The web server transmit the various elements of the requested page to the browsing application. Any special data formats, e.g., video, certain images, documents not written in HTML language, etc., are treated by one or more web browser software plug-ins on the client computer.

A common need is to be able to view the document, i.e., images, etc., on the client computer and be able to add one or more annotations to the document. It is becoming more and more common for groups of two or more people to work collaboratively on a project. The members of the group may or may not be located in the same geographic area. The collaboration is often via a network such as the global Internet. The members of the group may be located anywhere in the world as long they have a connection to the Internet.

The ability to annotate documents displayed on screen is very useful when information needs to be exchanged among more than one person. It would be beneficial if one persons's comments could be shared among many others by attaching notes that travel with the underlying document being worked on.

Currently, however, it is not possible to annotate documents on the client side such that other clients can see the notes. The entire document with the attached notes must be transmitted to other clients for them to see the notes. Transmitting the entire document from client to client through the server in order to exchange annotation is burdensome, inefficient and costly in terms of time and bandwidth.

The majority of prior art systems that with image and page annotation are adapted to handle annotation only on the client side. In these systems, a user launches an editing tool to open a document locally on her/his computer. The document is edited locally with the other clients not being able to easily view the changes or notes. Some of these editing tools permit attaching data information such as annotations to the document. These systems operate by saving the annotations within the local file system that is also used to store the document.

Also known in the prior art are systems that permit collaboration that is based on the replication of the display at one client system to the display on another client system. These systems, however, require that all parties to the collaboration session be logged on to the server at the same time in order to view the annotations made by one or more of the parties.

Thus, there is strong felt need for a system that would allow multipartly collaboration based on the asynchronous exchange of annotations over a network such as the Internet without the requirement that all parties wishing to collaborate be simultaneously logged on to a server.

SUMMARY OF THE INVENTION

The present invention is a system for collaborative document annotation whereby notes or annotations associated with a document, such as an image or text document, are stored on a web server. The documents and associated annotations are treated independently from each other. Separate data structures are created for the documents and for the associated annotations thus permitting their independent management.

The invention can be implemented as software, a portion of which executes on the server side and a portion that executes on the client side. The server side may comprise a plurality of software applications running in parallel that in combination provide the server functionality of the invention. A web server application on the server side functions to capture special requests from one or more client applications for creating, storing, editing and retrieving, annotations related to specific documents located in the server. A notes server functions to log all annotation activities along with information about the corresponding clients that create, edit and retrieve them.

The notes information are transmitted between client and server applications via TCP/IP protocols over communications means such as a LAN, WAN or the Internet. The invention may be adapted to operate over an Intranet, e.g., LAN, or Extranet, e.g., WAN or the Internet.

On the client side a client software application functions to display the document that the user wishes to annotate and provides the tools necessary to permit the user to create, edit, retrieve and store notes. Note that the client software application can be implemented as a web browser plug-in module. The plug-in contains the user interface for navigating within the document and for handling the notes.

A synchronization button is provided which, when pressed by the user, transmits the annotations generated by the user from the client to the server using a particular protocol. In response, the server transmits back an acknowledgement along with any new notes that other clients may have posted since the last synchronization was performed.

A user may annotate many documents at the same time by opening several web browser windows. In addition, other clients can annotate either the same document or other documents at the same or a later time. In accordance with the invention, the annotations are transmitted from the server independent of the data transmitted that is related to the viewed document. At the client side, the client application layers the annotations over the image (or document) in accordance with the coordinates of each.

As a result, the present invention has the advantage of permitting multiple clients to annotate a document that resides on a central web server in an asynchronous fashion. When annotations are posted to the server by a client, the state of the annotation database is synchronized such that all other clients can retrieve the current, up to date annotations associated with a document. As an option, the server can be adapted to trigger one or more alarms in response to a change being made to the database maintained by the server. Those clients that wish to be notified in the event of a database change at the server, can be notified by means of visual indications, audio and/or e-mail. In addition, the alarms can filtered in numerous ways. Examples of filtering include, but are not limited to, specific documents, document types, document folders, annotation contents and specific clients.

The system of the present invention further allows annotations to be kept private. Annotations can be kept secure from changes made by non authorized clients. The time an annotation was created is also tracked and stored in terms of the clock in the server. When the time stamp of the annotation is shown on the client, it is shown in terms of the clock on the client.

There is provided in accordance with the present invention a system for annotating documents comprising a document file located on a server, the document file for storing one or more documents, a notes database located on the server, the notes database for storing one or more notes, each note associated with a particular document, one or more notes clients coupled to a network, each notes client operative to locally display a representation of a document remotely stored on the server in the document file, the notes client adapted to permit a user to annotate the document with one or more notes, the notes client operative to simultaneously display the one or more notes associated with the document over the displayed document such that the document is viewable along with the one or more notes, a notes server coupled to the network, the notes server operative to store the documents in the document file separately from notes stored in the notes database, the notes server receiving one or more notes associated with a particular document from the one or more notes clients and synchronization means within the notes clients and the notes server, the synchronization means for updating the notes server with any notes events processed by the notes clients and for updating the notes client with the results of synchronization updates previously performed by other notes clients since the last synchronization event.

The notes database comprises a Notes Table for storing the current content of a note and a Notes Log Table for storing a transaction history of all not events for notes associated with a particular document. The notes client comprises a display, network communication means, a processor suitably programmed to run a web browser and a client note plug-in adapted to run within the web browser.

The network comprises the Internet, a TCP/IP network or an Intranet. The notes server comprises network communication means, a processor suitably programmed to provide a web server services, provide notes agent services, provide document and notes browsing and synchronization services to the one or more notes clients. The notes agent services comprises an Internet Server Application Programming Interface (ISAPI).

The system further comprises a notes administrator for providing one or more Universal Resource Locations (URL) aliases in managing and adminstrating the notes server and a note viewer for generating reports on the history of annotation on a per user or a per document basis that have occurred over a period of time.

The system permits two or more user to collaboratively work on the same document whereby each user is capable of viewing annotations made by the other users upon synchronization with the notes server. A single page of a multipage document can be annotated on a notes client without requiring the entire multipage document to be transmitted to the notes client.

The system further comprises security means for providing Universal Resource Locator (URL) translation and redirection services so as to provide user level security for documents and notes stored on the server. The security means comprises a Document Location Table and a Client Access Key Table.

The document comprises an image or a document consisting of a page description language. The notes client is adapted to permit the user to annotate the document in parallel with the display of the document. The document comprises a plurality of pages whereby each page can be annotated independently of all the other pages. The synchronization means is user initiated or is triggered by the notes via the signaling of selected notes clients.

There is also provided in accordance with the present invention method of annotating documents, the method comprising the steps of getting a first request comprising a Universal Resource Locator (URL) associated with a document to be viewed and annotated and transmitting the first request from a client to a server, sending a first response from the server in response to the first request, the first response comprising the document type of and a representative of the requested document, getting a second request comprising a document note URL corresponding to the notes associated with the document and sending the second request from the client to the server, sending a second response from the server in response to the second request, the second response comprising one or more notes associated with the document, displaying the representation of the document and the associated one or more notes locally on the client such that both are viewable simultaneously, permitting the user to perform annotation functions on the client so as to generate a third request comprising one or more note events related to the document that are transmitted from the client to the server and sending a third response from the server to the client in response to the third request, the third response comprising an updated list of notes associated with the document, the list of notes incorporating any note events previously received from other clients.

The step of getting a first request comprises the step of querying the user for a user name and password. The step of sending a first response comprises the step of authenticating the user on the server before sending the first response. The method further comprises the step of getting a fourth request comprising a folder URL associated with the folder comprising one or more documents to be viewed and annotated and transmitting the fourth request from the client to the server.

The method further comprises the step of sending a fourth response from the server in response to receiving a request comprising a folder URL, the fourth response comprising a directory listing of the folder. The document comprises an image or a document represented using a page description language.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

Figure 1A:
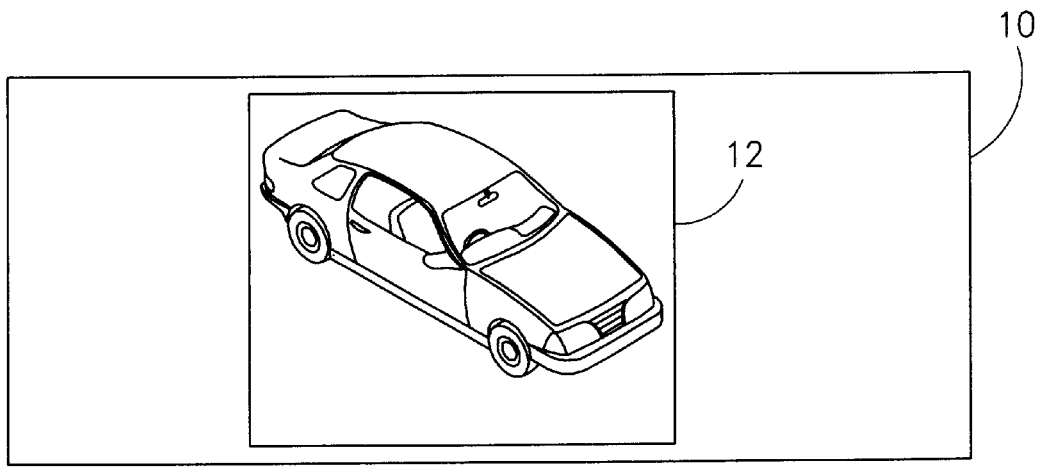
FIGS. 1A, 1B, 1C are illustrations of an example image displayed with and without multiple annotation displayed thereon.

The following notation is used throughout this document.

| Term | Definition |
| --- | --- |
| GMT | Greenwich Mean Time |
| HTML | Hypertext Text Markup Language |
| HTTP | Hypertext Transport Protocol |
| IIS | Internet Information Server |
| IP | Internet Protocol |
| ISAPI | Internet Server Application Programming Interface |
| LAN | Local Area Network |
| MIME | Multipurpose Internet Mail Extension |
| NFS | Network File System |
| PDF | Portable Document Format |
| RAM | Random Access Memory |
| RGB | Red Green Blue |
| SMTP | Simple Mail Transport Protocol |
| SQL | Structured Query Language |
| TCP | Transport Control Protocol |
| TIFF | Tag Image File Format |
| URL | Universal Resource Locator |
| WAN | Wide Area Network |
| WWW | World Wide Web |

The following terminology and definitions apply throughout this document.

| Term | Definition |
| --- | --- |
| Annotation (Note) | A portion of text or a graphical drawing that is associated with a specific location in a document. |
| Annotation Session | The time period during which a user creates, edits, retrieves and stores one or more notes associated with a document. |
| Note Alarms | Notifications that the Notes Server received a Note Event. |
| Note Anchor | The specific location in a document associated with a note. |
| Note Client | The application that displays the annotated document and allows for annotation sessions. |
| Note Contents | The text or graphical information contained in the note. |
| Note Document ID | Identifier for documents and sets of aggregated documents organized under the same logical structure. |
| Note Event | A message related to a note that did not exist at the time of the last synchronization with the Notes Server, or a note that was modified or deleted since that time. |
| Note Owner ID | Identifier used to differentiate between notes generated by various users. |
| Note Persistence | Mechanism whereby the Notes Clients saves the Note Events to the local file system, allowing for synchronization at a later time. |
| Note Serial Number | A number uniquely identifying a note. |
| Note Server | The application that provides the centralized role of document and note management. |
| Note Synchronization | The update activity whereby one or more Note Events are exchanged between the Notes Server and the Notes Client. |
| Note Time Stamp | The time stamp saved on the Notes Server, stored using time zone of the Notes Server. |
| Notes Database | The database maintained by the Notes Server holding all note related information. |
| Notes Log | A transactional history of Notes Events. |

General Description

The present invention is a system for collaborative document annotation whereby notes or annotations associated with a document are stored on a web server. Examples of documents include, but are not limited to, images, text documents or documents expressed in a page description language such as Postscript or Adobe PDF. In addition, each document may contain more than one page, wherein each page is annotated independently of the other. The documents and associated annotations are treated independently from each other. Separate data structures are created for the documents and for the associated annotations thus permitting their independent management. The invention can be implemented as software, a portion of which executes on the server side and a portion executes on the client side. The server side may comprise a plurality of software applications running in parallel that in combination provide the server functionality of the invention. A web server application on the server side functions to capture special request from one or more client applications for creating, storing, editing and retrieving annotations related to specific documents located in the server. A notes server functions to log all annotation activities along with information about the corresponding clients that create, edit and retrieve them.

Figure 1B:
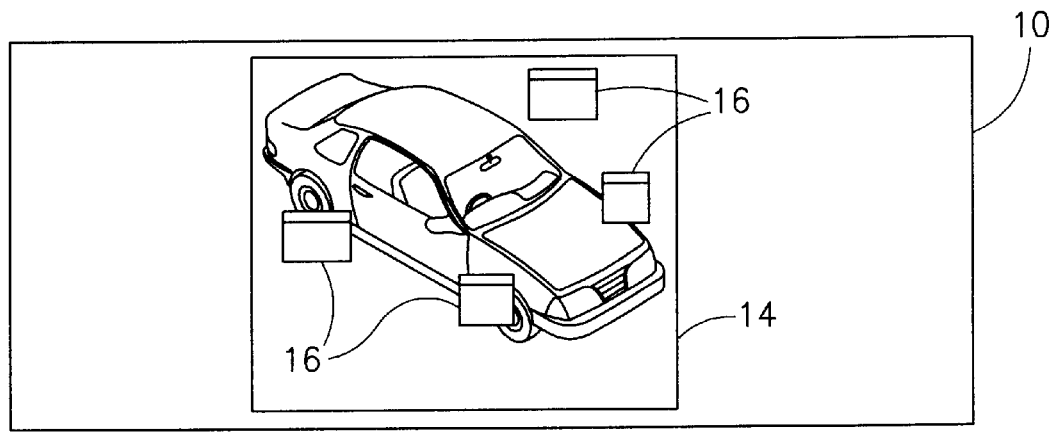
Figure 1C:
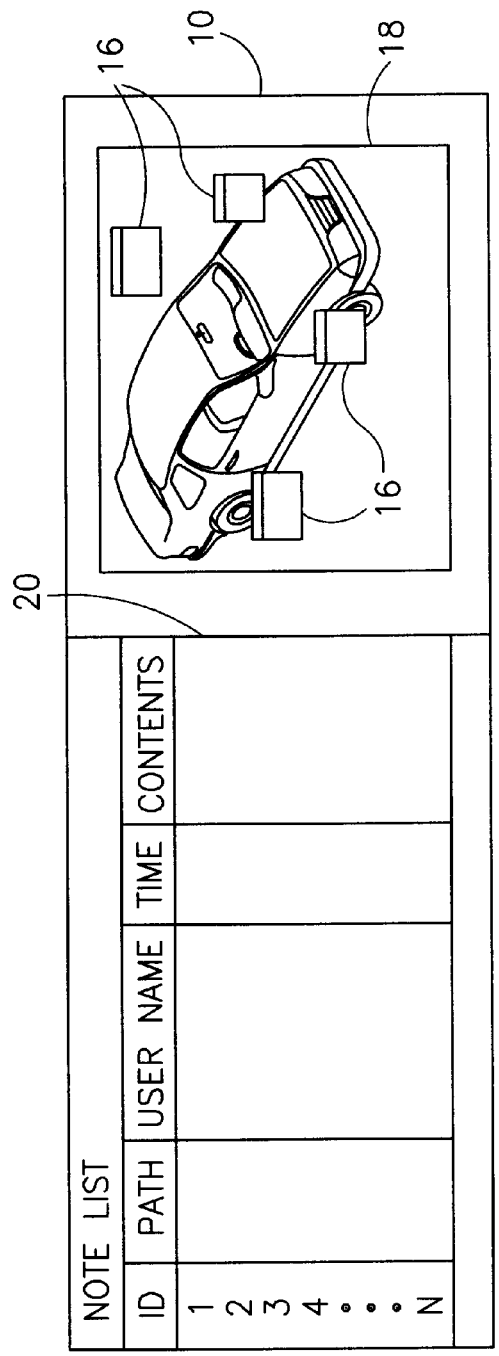

Illustrations of an example image displayed with and without multiple annotations displayed thereon are shown in FIGS. 1A, 1B and 1C. The system of the present invention is suitable for use with a variety of document types, including text and image based documents. For illustrative purposes, the following description uses an image type document to illustrate the principles of the invention. This is not meant to limit the scope of the invention. One skilled in the computer and software arts can apply the system the invention to other document types as well without departing from the spirit and scope of the present invention.

In FIG. 1A, the display 10 is shown comprising a single document window 12 in which an image is displayed. No annotations are displayed in this view. In FIG. 1B, the display 10 is shown comprising a single document window 14 in which an image is displayed with a plurality of annotations 16. The annotations 16 are displayed over the image but are not a part of the image itself. In FIG. 1C, the display 10 is shown comprising two portions: the image window 18 and a Note List window 20. The image window 18 displays the image with the plurality of annotations 16 on top of the image. The Note List window 20 displays a list of all the annotations associated with the image shown in window 18. The user can optionally sort the Note List by Note Owner ID, Note Time Stamp, Note color label and Note Contents. The display may include Note Event description, Note Owner ID, user name, path, originator IP address, time and Note Contents. When a note is selected on the Note List, its counterpart icon in the document window frame is highlighted.

Figure 2:
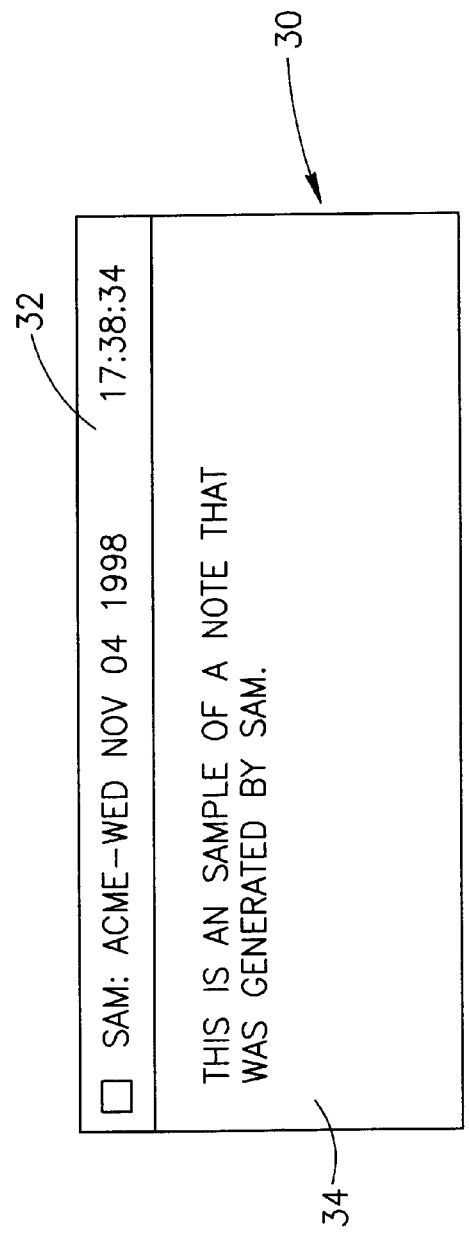
FIG. 2 is an illustration of an example annotation.

An illustration of an example annotation is shown in FIG. 2. The annotation, generally referenced 30, comprises a window having a title portion 32 and text portion 34. The window contains a note label (Sam), Note Owner ID or login name (Acme) and the data and time of the most recent synchronization.

Figure 3:
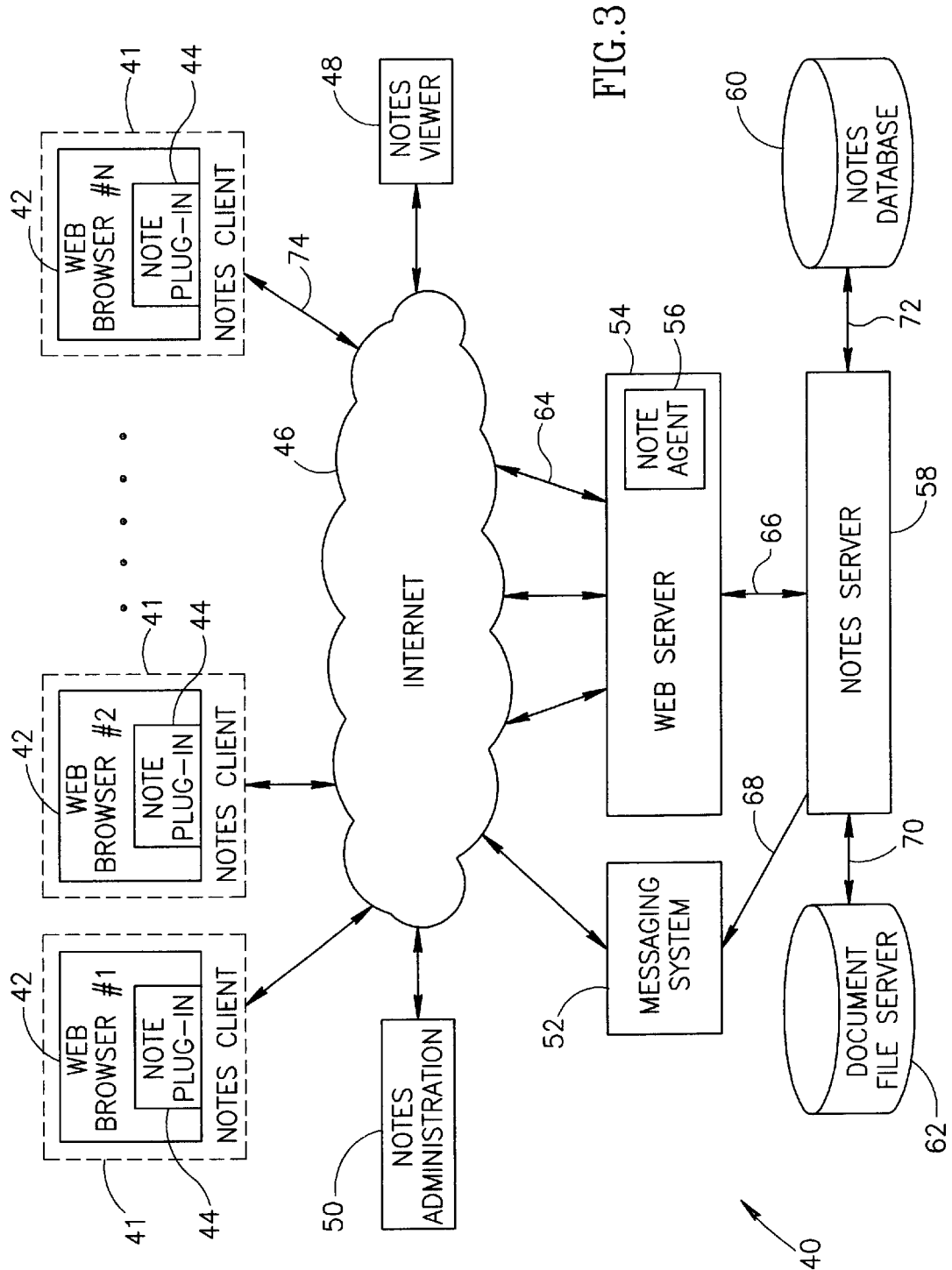
FIG. 3 is a block diagram illustrating the collaborative document annotation system of the present invention.

A block diagram illustrating the collaborative document annotation system of the present invention is shown in FIG. 3. The annotation system, generally referenced 40, comprises one or more standard web browsers 42 labeled web browser #1 through web browser #N. Each web browser comprises a Note Plug-In component 44 that loads into the browser. The web browser 42 may comprise any suitable browser such as Netscape Navigator or Microsoft Internet Explorer. Each web browser in combination with the Note Plug-In is referred to as a Notes Client 41 and is the tool used for browsing the documents located on the server side. The Note Plug-In is invoked each time the browser gets a response from the Web Server 54 with a particular Multi-purpose Internet Mail Extension (MIME) identifier. The communication protocol between Notes Clients and Notes Server is standard Hyper Text Transport Protocol (HTTP). The web browsers are adapted to communicate over a global TCP/IP network such as the Internet 46. The web browsers 42 and the Notes Server 58 communicate with the web server 54 via the HTTP protocol.

The server portion of the system 40 comprises a web server 54 with integrated Note Agent 56, Notes Server 58 coupled to a Notes Database 60, a Document File Server 62 and a messaging system 52, a Notes Administrator 50 and a Notes Viewer 48. The Notes Server communicates with the Notes Database via any suitable database language/protocol such as SQL. The Notes Server communicates with the messaging system via standard SMTP.

Annotation (Note)

An annotation or note is a portion of text or a graphical drawing that is associated with a specific location in a document. The terms annotation and note are intended to mean the same thing and are used interchangeably throughout this document. The location associated with a note in the document is called a Note Anchor and is kept separate from the annotation data itself. Once a note is created, its anchor point can be changed by the user. The note anchor is expressed in terms of (X, Y) coordinates in the annotated page of a document. A note anchor may be set to a coordinate value of (0, 0) if the document associated with the note is a logical folder. Note that the annotation can be displayed within its own window or can be layered on top of the displayed document. The first option is used in the case of text only annotations. The second option is used for mixed text and graphical annotations.

Notes Client

The application that displays the annotated document and allows for annotation sessions is called the Note Client and comprises the web browser 42 and Note Plug-In 44. In order to differentiate between notes generated by various users, each user chooses a unique user ID that forms a Note Owner identifier. The Note Owner ID is formed from a combination of the chosen user name and user login name used when logging on to the annotation system. The unique Note Owner ID is displayed in the note window title bar 32 (FIG. 2) or when the Note Client application shows note properties for a graphical note, i.e., a note not within a window.

Notes are associated with specific documents that are stored on the server side. A note can belong to one document or to a set of documents aggregated under the same logical structure. Documents are document aggregations are identified by their Note Document ID. The Note Document ID is a unique Universal Resource Locator (URL) on the World Wide Web.

It is important to note that the client portion of the annotation system of the present invention is not limited to implementation via a web browser and associated plug in. The invention can be implemented using any suitable means including, but not limited to, stand alone clients that implement the same functionality without the use of a web browser and/or plug-in software component.

Notes Server

The Notes Server 58 functions to provide the central document and note management features. Normally the Notes Server functions in conjunction with a web server 54. It may access documents that reside in its own file system or that reside on remote file servers 62 located within the local area network. In addition, the Notes Server 58 may access these file servers and file systems by means of network file system protocols (represented by arrow 70). Once accessed, their contents are transmitted to the Notes Client Applications via TCP/IP protocols over communication means such as LAN, WAN or the Internet 46. Note that the invention may be implemented to operate over an Intranet, e.g., LAN, or Extranet, e.g., WAN or the Internet.

An Annotation Session starts when a user logs onto the Web Server 54 by supplying a user name (user ID) and password. The Notes Server 58 requests this information when the user browsers to a protected URL, which is the URL of a document to be viewed and/or annotated. The Notes Server 58 associates the user name and password with the IP address of the request for identification purposes later in the Annotation Session. A session terminates when no activity is sensed by the Notes Server 58 for more than a predetermined period of time. Note that no special logout procedure is required to end an Annotation Session. The document protection mechanism can be set in combination with the web server security and the document file system security.

The Notes Server assigns a unique Note Serial Number upon the creation of each note. This number serves to uniquely identify each note in the system. A Note Event is defined as a message related to a note that did not exist at the time of the last synchronization with the Notes Server or a note that was modified or deleted since that time. Note that, at the client side, the user is permitted to create new notes, modify the contents of notes, modify the anchor points of notes and delete notes. Only users with sufficient privileges, however, can modify notes. The system can be configured such that users without sufficient privileges are not permitted to view specific notes or to change them.

It is important to note that the server portion of the annotation system of the present invention is not limited to implementation using a web server. The invention can be implemented using any suitable means including, but not limited to, a stand-alone HTTP server that implements the same functionality without the use of a web server. In addition, the invention is not limited to any specific client/server protocol implementation, e.g., HTTP.

Notes Synchronization

Note Events are exchanged between the server and the clients. Notes Clients forward to the Notes Server requests to view, modify, create or delete notes. In response, the Notes Server Updates the clients with an up to date note list per document. This updating activity is termed Note Synchronization. The synchronization process is performed asynchronously and is always initiated by the Notes Client in response to the user, i.e., it is user driven.

Alternatively, the synchronization process can be initiated by the Notes Client in a periodic manner, i.e., polling, or by the Notes Server when the exchange protocol in use allows for it. In the former case, the client would continuously poll the server. Utilizing Java in the server, rather than HTTP, permits the server to trigger the client and update the client display, if permitted to, since it is not practical for the server to poll clients. The server pushes new notes to selected clients by triggering them to pull new notes from the server. This serves to simulate a user pressing a synchronization button. This service can be provided for those clients that request it. Note that although the description contained herein refers to the user driven synchronization process, the scope of the invention is intended to include other processes as well, such as server polling and server initiated synchronization via protocol means.

If the user elects to exit the display and annotation application or chooses to display and annotate another document without synchronization the previous one, the Notes Client application saves the Note Events to the local file system. The next time the user browses to the same URL using the Notes Client application, these events can be synchronized. Thus, the system allows for Note Persistence on the client side.

The Notes Server can be implemented as a process running on the web server computer. Alternatively, it is a process running on a separate computer that communicates with the web server. In either case, its functionality is the same. It is responsible for processing note events and maintaining the Notes Database and the Notes Log. The protocol the Notes Server utilizes is based on the well-known HTTP protocol. The Notes Server generates two independent HTTP streams: the first stream is for the displayed image and the second stream is for the annotations. Note again that alternatively, the invention can use any TCP/IP based protocol such as Java rather than HTTP.

The time of modification (in local client time) is stored as part of the Note Event. The Notes Server ignores the locally generated time stamp and records the time (in server time) of arrival for the event in the Notes Database and the Notes Log. The time stamp is termed the Note Time Stamp. The Notes Server calculates the difference between its own clock and the client clock to obtain the time zone of the client each time a Notes Synchronization is initiated at the client side. The time the Notes Client displays to the user for each event is the Note Time Stamp that was saved in the Notes Server adjusted to the local time zone of the client.

The administrator or other users (i.e. clients) of the Notes Server may elect to be notified each time a Note Event is received by the Notes Server. The notification can be made using any suitable means of notification including, but not limited to visual alarms, audible alarms and/or automatic e-mail messaging sent to the administrator or the user of the system. These notification alerts are termed Note Alarms and are useful for document management workflow. Alarm notifications can be generated in accordance with various criteria including the type of Note Event, type of document. In addition, filtering may be performed on a user basis or on a document basis.

Notes Server and Notes Database

On the Web Server 54, special address aliasing is provided by means of the Note Agent 56. The Note Agent 56 may be implemented as a Web Server Internet Server Application Programming Interface (ISAPI) filter or as a Web Server extension, both techniques being well known in the computer networking arts. All requests to aliased URLs are processed by the Note Agent 56 that in turn transfers the requests to the Notes Server 58.

The Notes Server 58 may reside in the same computer as the Web Server 54 computer or may reside in another computer located on the Local Area Network (LAN). The Notes Server 58 functions to receive modified URLs from the Note Agent 56 and provide in return individual documents and their associated annotations. If a document holds more than one page, the server may provide one page at a time to the client. Note that the documents may reside in the same file system as the Notes Server or in another file server 62 necessed over the local area network. The Notes Server 58 accesses the Document File Server 62 by means of stand Network File System (NFS) protocols.

The Notes Server 58 functions to keep track of all annotation activity in the Notes Database 60. The Notes Database 60 can be implemented in numerous ways. A convenient implementation is to use a standard SQL relational database. A Notes Table (not shown) in the Notes Database 60 is used to reflect the current state of the annotated documents. Transaction history is handled by a Notes Log Table (not shown) also stored in the Notes Database 60 which is implemented as a transaction log. All creation, modification and deletion events are logged on the Notes Log Table. The database is a useful tool for tracking all annotation and other activities on a per use or a per document basis. In addition, a viewer application such as Note Viewer 48 can optionally be used to generate reports on the history of annotations on a per user or a per document basis that occurred over a period of time.

Each record in the Notes Table of the Notes Database 60 utilizes the unique Note Serial Number for the key index. Each record in the database comprises the following information: Note Document ID, Note Contents (text or graphical information), Note Anchor coordinates, Note Time Stamp and Note Owner ID. This information is extracted from the Note Event data structure, which is described in more detail hereinbelow.

To simplify the implementation of the Notes Database 60, the Note Contents can be limited to a specific size. For example, the text of a note may be limited to a specific number of bytes or characters, or the graphic drawing can be limited to a specific number of control points. Creating limits on the size of the note allows the record size to be predicted in advance. In some systems this may be important. The size limitation can be checked by the Notes Client or by the Notes Server when processing the Note Event transaction.

The Notes Server may be configured to utilize external messaging system 52, such as an electronic mail server, for generating alert notifications to specific users. The users receiving the alert notifications may or may not be clients of the annotation system. The alert notifications may comprise any portion of the notes themselves along with additional information about the annotated document and the severity and/or uregency of the message.

The management of the Notes Server 58 and the Note Agent 56 in the Web Server 54 may be performed by a Notes Administration tool 50. One of the main functions of the Notes Administration tool is to provide the URL aliases needed for controlling access to specific documents.

Security and URL Aliases

Access permissions to the Notes Server 58 are defined on a per client user basis. As part of the task of administering the system 40, a directory is created for the user in the annotation root folder under the root directory of the web server 54.

The Note Agent 56 maintains two translation tables: a Document Location Table (Table 1) and a Client Access Key Table (Table 2). Both tables are present below.

TABLE 1

Document Location Table

| Alias | Actual Path |
|---|---|
| Archive | D:\Arc |

TABLE 2

Client Access Key Table

| Client Name | Access Key | Location Alias | Sub Path |
|---|---|---|---|
| Acme | Acme_Docs | Archive | Acme_files |

In order to access the system, a client needs to provide the Note Agent Trigger Token as part of the URL. In the example presented herein, this is the token 'annotate.' This Trigger Token is used by the Web Server 54, e.g., Microsoft Internet information Server (IIS), to invoke the filter in the Note Agent 56 to translate the document path specified in the remainder of the URL. The requested URL is as follows below.

Requested URL=http//domain_name/annotate/Acme_Docs/Subfolder/document.name where
   domain name='domain_name'
   Note Agent Trigger token='annotate'p1 Customer Access key='Acme_Docs'
In accordance with the above described aliaisng mechanism, the system 40 may ask users to type in their unique user name and password in order to obtain permission to browse particular locations or file systems in the local area network on the server side. In this manner, users can access their private documents for display and annotation purposes while not violating the privacy and security of other users of the system.

For example, assuming a Microsoft IIS Web Server 54 that defines 'C:\Inetpub\wwwroot' as the base document root, the NOtes Server 58 will utilize a sub folder called for example, 'annotate.' This specific name 'annotate' would trigger the Note Agent ISAPI filter 56 in the Web Server 54 to translate the URL as specified below.

If 'Acme' is a name of a user of the system, a folder named 'Acme_Docs' will be created under the 'C:\Inetpub\wwwroot' directory. This folder is the Client Protocol Folder. Using the operating system security flags, only a user named 'Acme' would be given rights to browse this folder.

Client Protected Folder–'C\Inetpub\wwwroot\annotate\Acme'

The Note Agent 56 functions to provide mechanisms for translating URL addresses under the 'Acme_Docs' folder in such a way that logical names can point to physical folders on the same computer or on other computers located in the network. In connection with the example presented above, the Client Document Root physical path is as follows.

Client Document Root physical path='d:\Arc\Acme_files'

The Client Document Root physical path is translated to the following URL.

Translated UTL_'http://domain_name/annotate/Acme_Docs'

As a result, the 'Acme' client is granted permission to access any document under her/his Document Root folder. Note that neither the Document Location Table (Table 1) nor the Document Access Key Table (Table 2) is limited in length. Thus, a client may have more than one access key. In addition, there may be more than one alias associated with the same physical folder; each alias providing protection for a different client.

Annotation Session: Initialization

Figure 4:
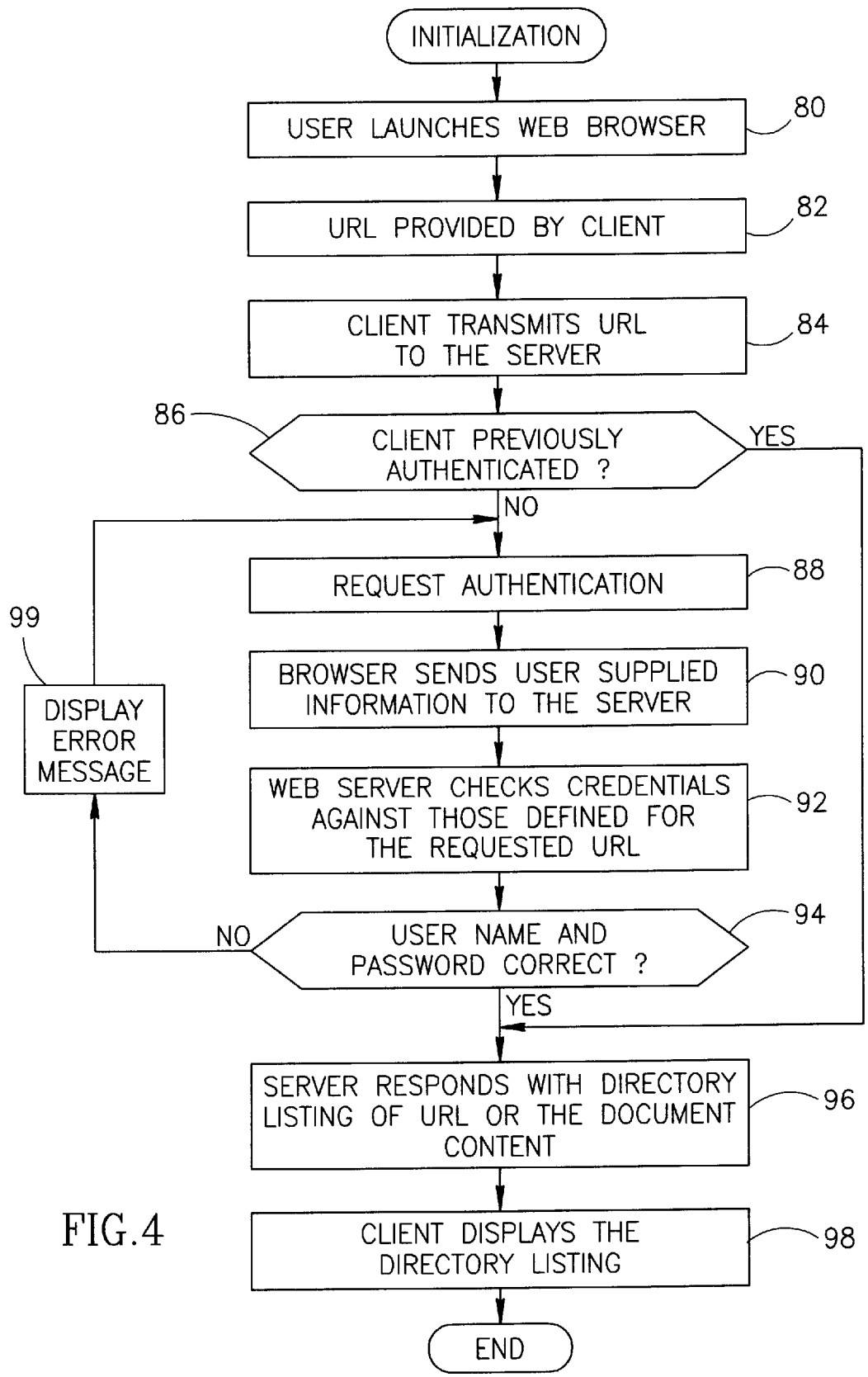
FIG. 4 is a flow diagram illustrating the initialization portion of the collaborative document annotation system of the present invention.

The following describes the initialization portion of an Annotation Session in more detail. A flow diagram illustrating the initialization portion of a general Annotation Session is shown in FIG. 4. Note that the client/server protocol used throughout the session is the HTTP protocol.

The Session starts when the user launches a web browser and provides a URL in the form that was described above and in FIG. 3. This URL refers to a directory or to a specific document. The document may contain one or more pages. An example for a single page document is a TIFF file format image. An example of a multi-page document is an Adobe Portable Document Format (PDF) document.

Initially, the user launches her/his web browser (step 80). To initiate the initial request, the client, via her/his web browser, provides a URL (step 82) which is transmitted to the server (step 84). The server verifies whether the client was already authenticated (step 86). If the client was not previously authenticated, the server requests authentication from the user in response (step 88). To authenticate a user, the browser first displays a dialog to the user, asking for a user name and password. The browser then transmits the user-supplied information to the server (step 90). The web server then checks the credentials submitted against those defined for the requested URL (step 92). The construction of the URL and associated aliases was described previously in the section entitled Security and URL Aliases.

If the user name and password provided by the user are not correct (step 94), an error message is displayed (step 98) and the authentication portion is repeated (step 88). The user is then queried again for the correct user name and password. If the user name and password provided by the user are correct (step 94), the server responds with the directory listing of the URL requested by the user or with the contents of a document if the URL was referring to a specific document (step 96).

The client then displays the directory listing in a window within the web browser (step 98). It is likely that the directory contains documents that the user may wish to annotate at some point in time. Note that the list of documents sent by the server when browsing is first filtered by the Notes Server 58 (FIG. 3) to display only those documents with file types that the Note Server knows how to interpret.

Figure 5:
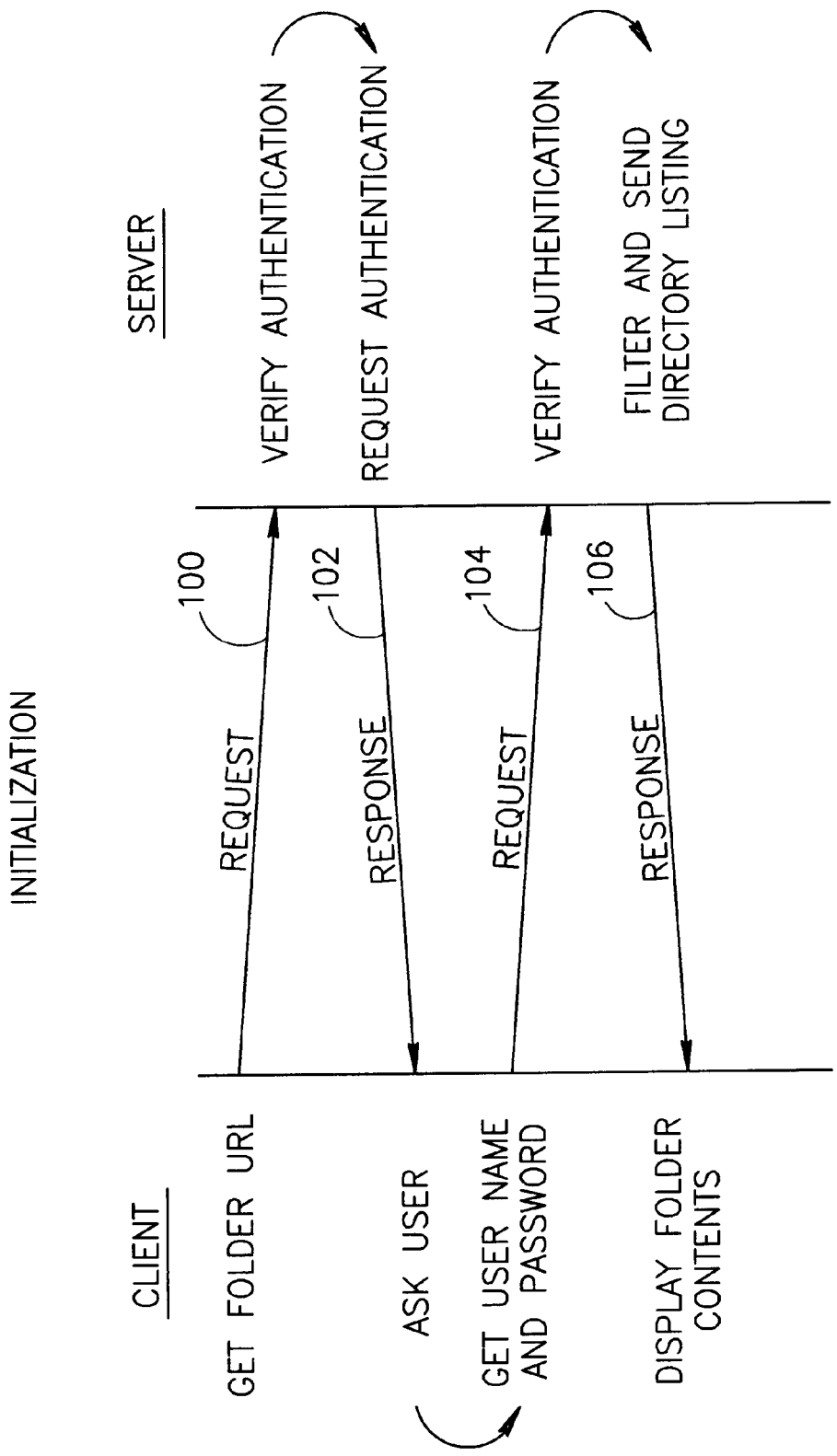
FIG. 5 is a message flow diagram illustrating the transaction sequence between client and server during initialization.

A message flow diagram illustrating the transaction sequence between client and server during initialization is shown in FIG. 5. As described above, the first request (referenced 100) is made by the client with the requested URL to be displayed. The server first verifies the authentication of the user. If not user name or password was submitted, the server responds with an authentication request (referenced 102). Once received by the client, the user is queried for a user name and password. The user-supplied input is sent as another request to the server (referenced 104). The server attempts to verify the authentication and if it passes, the server first filters and then sends the directory listing associated with the requested URL to the client (referenced 106). Upon receiving the directory listing, the client displays its contents in window in the web browser.

Annotation Session: Browsing

Figure 6:
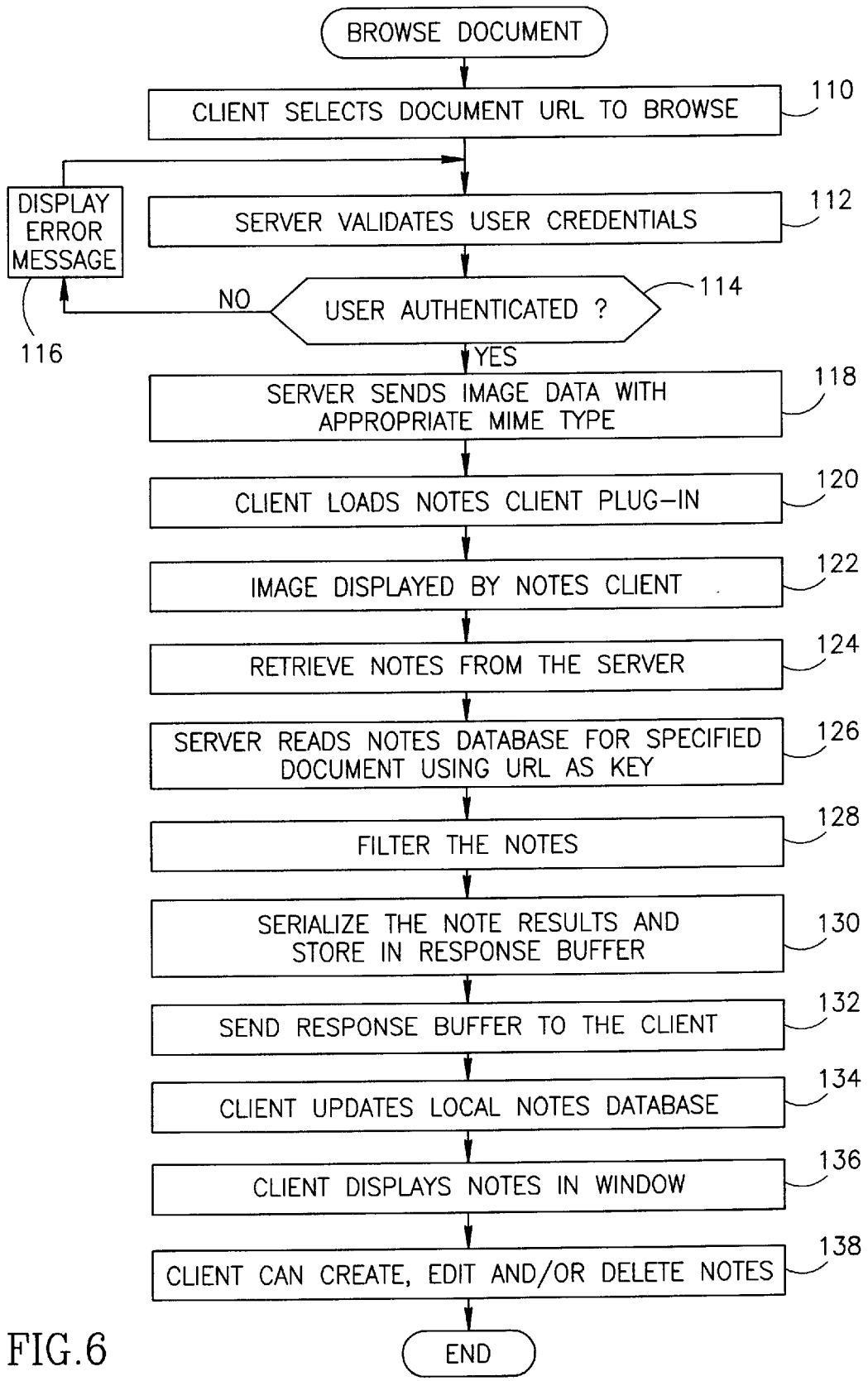
FIG. 6 is a flow diagram illustrating the document browsing portion of the collaborative document annotation system of the present invention.

The following describes the browsing portion of an Annotation Session in more detail. A flow diagram illustrating the document browsing portion of a general Annotation Session is shown in FIG. 6. Note that the client/server protocol used throughout the session is the HTTP protocol.

The client first issues a request to the server to view a particular document by selecting its corresponding document URL (step 110). Before the server responds with the requested data, it needs to validate the user's credentials once again since this request to view a document is considered a new connection to the sever (step 112). Assuming the user's name and password were supplied previously, the web browser provides the information automatically, thus avoiding an error message response from the server. If the user is not authenticated (step 114), an error message is returned and displayed on the client browser (step 116). The document is not transmitted to the user until the user is authenticated. The mechanics of user name and password authentication by the server was described in detail previously in the Initialization section.

Once authenticated, the server then responds by sending the document data, i.e., image data in this example, to the client with the proper MIME type (step 118). The MIME type sent to the client in response to the request is unique and is the name for all document types. In response to receiving the MIME type, the web browser at the client, loads the Note Plug-In (44 (FIG. 3) on the client (step 120). The Note Plug-In client functions to take control of the browser display window and begin displaying the image (step 122).

Immediately thereafter, the client issues a request to retrieve the notes associated with the image, if there are any, from the server (step 124). The URL that is supplied to the server to retrieve the notes is the same UL corresponds to the underlying document (image) but having a suffix of '\notes' appended to it. Upon receiving the appended URL, the server searches the Notes Database 60 (FIG. 3) for the specified document using the URL as the key for searching (step 126). Once found, the server filters the notes so as to supply only those notes that the requesting client has permission to view (step 128). The server subsequently serializes the notes after filtering and stores them in a response buffer (step 130). The notes buffer is then sent as a response to the client (step 132). The response buffer data structure is described in more detail hereinbelow.

Upon receipt of the notes buffer, the client updates its locally stored Notes Database (step 134) and then displays the contents of the notes buffer in a window within the web browser (step 136). If the user has selected to view the annotations overlying the document, i.e., the image, then the client displays the notes similarly to that shown in FIG. 1B. The user then can process one or more notes, i.e., create new notes, edit existing ones and/or delete one or more notes (step 138).

Figure 12:
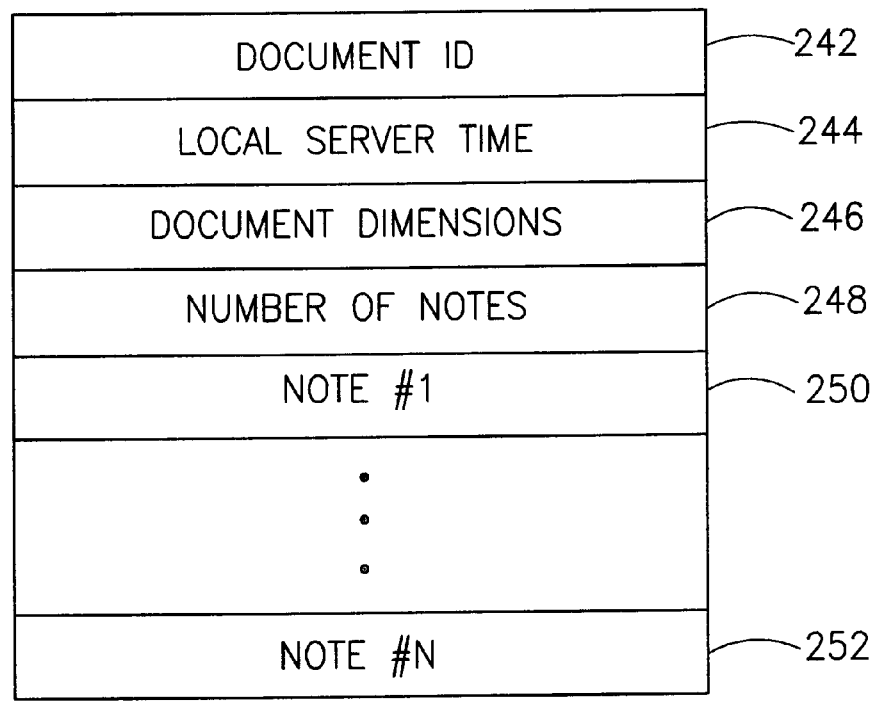
FIG. 12 is a diagram illustrating the Server Annotation Response Data Structure in more detail.

The client is now ready to display notes and accept modifications to them. The Notes Server has supplied the number of notes in the Server Annotation Response Data Response Structure (FIG. 12). If the number of notes is not equal to zero, the client checks the state of the viewing condition flag in the web browser Note Plug-In application. This variable may have the following values; show document only (corresponding to FIG. 1A), show document in addition to notes (corresponding to FIG. 1B), show document and notes in one web browser frame and a list of notes in another web browser frame (corresponding to FIG. 1C).

In case the third option is selected, another web browser frame is created and the document is redrawn in the right frame and the list of notes is drawn in the left frame. The notes displayed in the list in the left frame can be sorted and filtered using criteria such as, for example, time of creation, Note Owner ID, Note Contents, noted shape type, and note color.

In accordance with the invention, the client is capable of displaying the notes as they arrive from the server regardless of the state of the document image stream display. This allows the user to begin manipulating the annotations when large image documents are still in the midst of being transmitting from the server.

Figure 7:
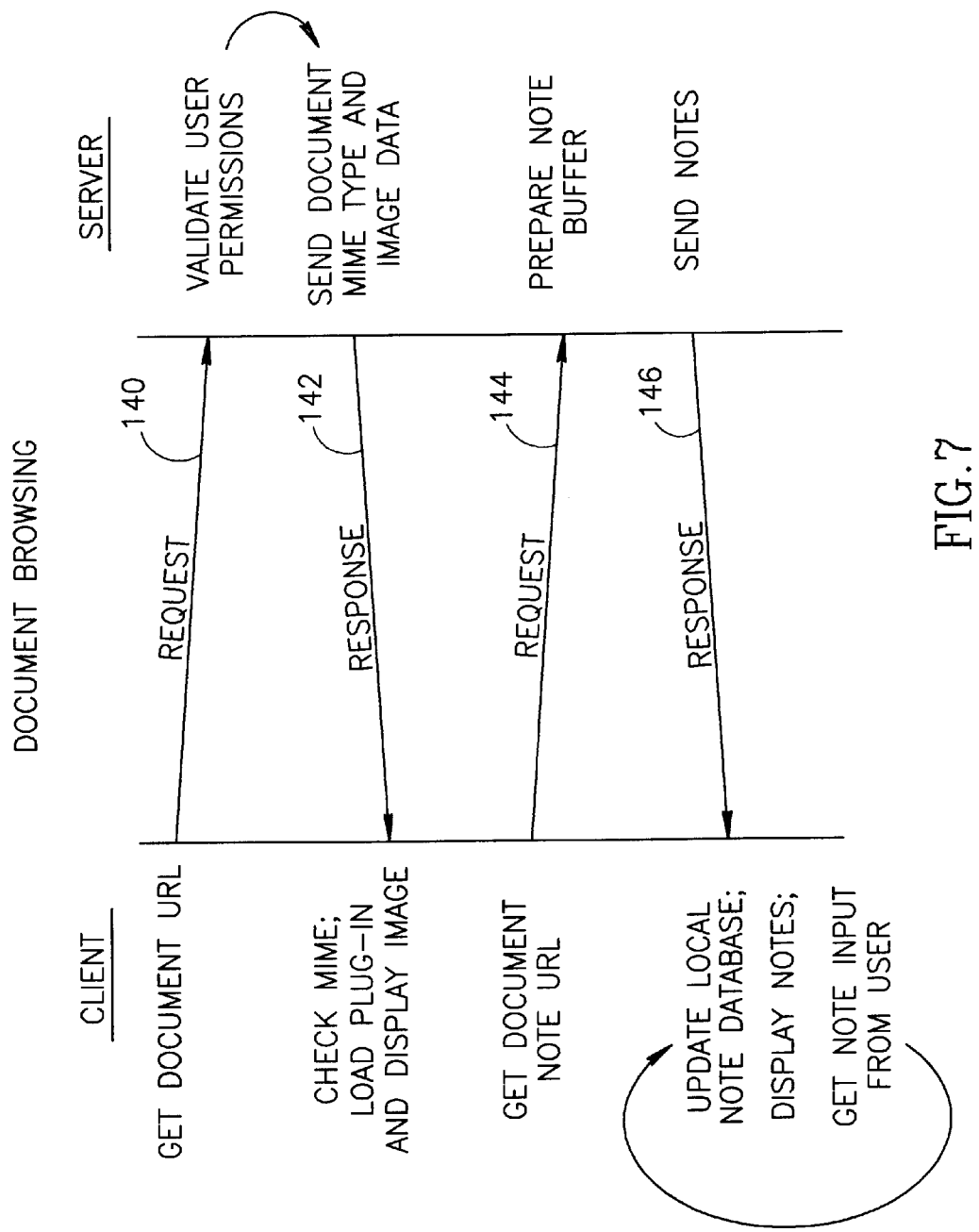
FIG. 7 is a message flow diagram illustrating the transaction sequence between client and server during document browsing.

A message flow diagram illustrating the transaction sequence between client and server during a document browsing general Annotation Session is shown in FIG. 7. As described previously, the client initiates a document browsing session by sending the document URL request to the server (reference 140). The server then validates the user permissions including user name and password. Once the user is authenticated, the server responds to the client with the document MIME type and the corresponding document data (image data in this example) (referenced 142).

The client checks the MIME type and, in response, loads the Note Plug-In into the web browser. Once loaded, the image is displayed in a window in the browser. Then, the annotations associated with the image are requested from the server by sending the URL corresponding to the document with the test '/notes' appended to it (referenced 144). The server searches the Notes Database and filters the notes for those corresponding to the image that the user has permissions for. The resulting groups of notes are serialized and placed in a notes buffer. The buffer is then transmitted to the client (referenced 146). The client receives the buffer, updates the local note database, displays the notes in a window in the browser and gets updates to one or more notes from the user.

In accordance with the invention, the Note Plug-In running on the client web browser provides the user with the capability to perform several operations on notes. In particular, the notes client permits a user to perform the following.

Notes can be created by selecting an annotation tool on the screen and placing the cursor in the area of the image where it is desired to place a note. A box is created and the user can enter text. Once entered, the text appears in the form of a 'stick' note that appears on top of the image. The Note Anchor is created at the location the user placed the note. Notes can be viewed by double clicking, for example, on a note icon. Note icons are displayed on the screen when the viewing option is set to display both notes and the image. A note can be closed after viewing by clicking on the box in the upper left-hand corner of the title bar 32 (FIG. 2). Note that alternatively, graphics can be entered into a note rather than test. In this case, a graphics tool or marker is used to place graphics in the note.

A note can be moved to a new location by grabbing a note icon and dragging it to a new location on the image. The Note Anchor is changed to correspond to the new location. Other features include printing the document with the notes attached; scrolling to another section of the document with the notes scrolling with the document; zooming in or out within the displayed document; deleting a note; resizing a note that contains either test or a graphic drawing; changing the default note color, dimensions and associated default marker. Further, notes can be synchronized with the Notes Server, which is described in more detail hereinbelow.

It is important to note that a user may create as many notes as she/he desires. Existing notes can be modified even if other users created them. The server, however, will not permit any changes that the user is not authorized to make. In accordance with the invention, all changes made to notes are saved in a local note database on the client. The database is managed within the RAM of the computer and is backed up on the local computer mass storage device, i.e., hard disk drive.

This backup of the database also functions to provide a recovery mechanism in case the user exits the application or requests a different URL without synchronizing with the server beforehand. The database is kept for a limited period of time before being erased. The time period is set by the user is typically on the order of a few days. While the database is saved, the user retains the option of synchronizing any unsaved notes the next time she/he browses to the same document URL.

The structure of the local note client database is similar to that of the server note database with the exception that no authentication checks are performed on the client. Thus, for example, the note database on the client does not contain a Note Owner password field.

Annotation Session: Synchronization

Figure 8:
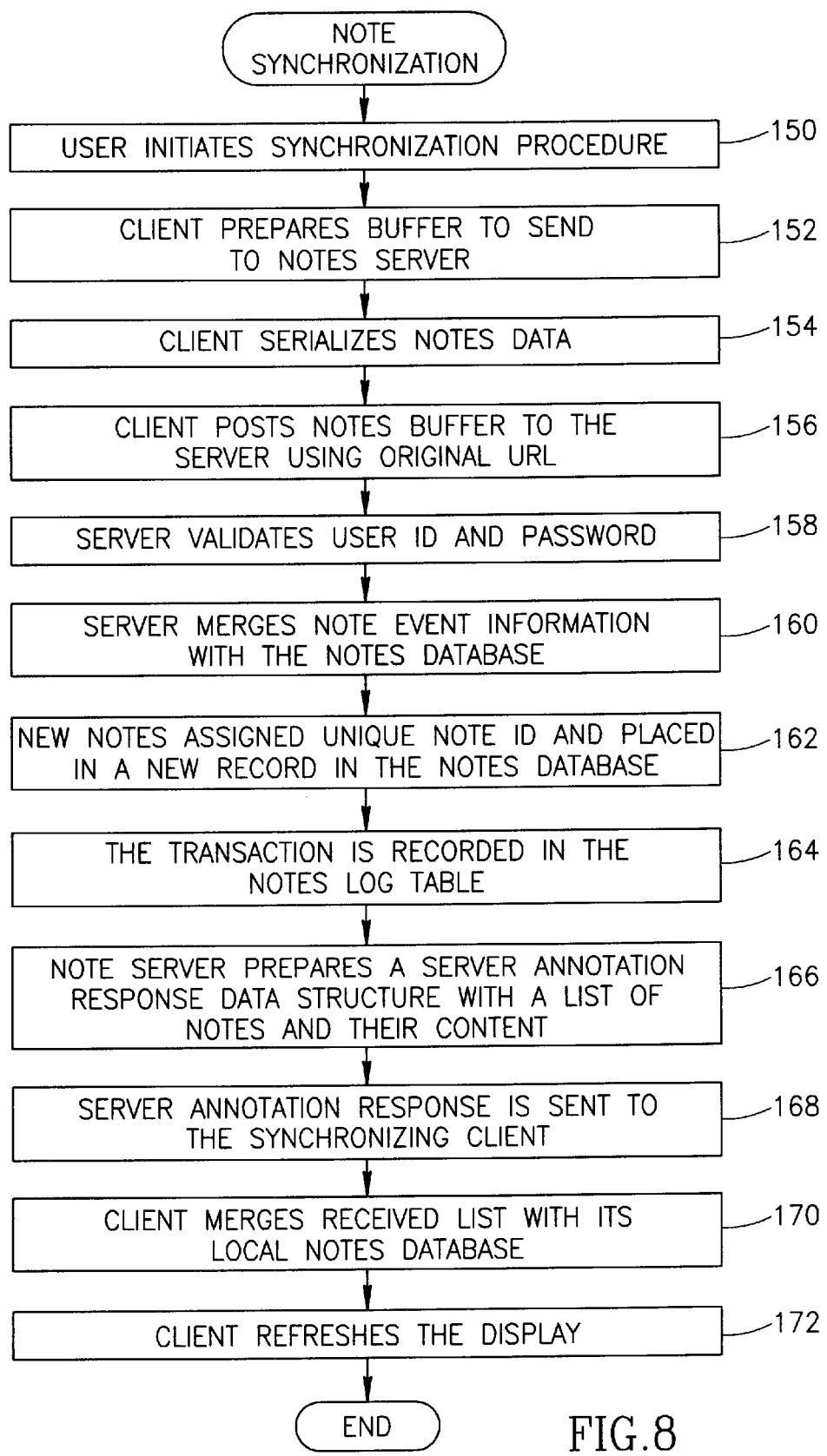
FIG. 8 is a flow diagram illustrating the note synchronization portion of the collaborative document annotation system of the present invention.

The following describes the synchronization portion of an Annotation Session in more detail. A flow diagram illustrating the note synchronization portion of a general Annotation Session is shown in FIG. 8. The process of synchronizing notes is initiated and driven by the user. The user initiates the synchronization process, for example, by pressing a button in the browser application called 'Sync' (step 150) The Notes Client, in response to the button press, functions to prepare a note buffer to send to the Notes Server (step 152). The note buffer contains only the notes that were changed since the time of the previous synchronization event. The time of the previous synchronization event is taken as either the time of the initial request to retrieve the current document or the actual time the user previously pressed the 'sync' button in the Notes Client application. The time of the last synchronization event is always known and stored by the Notes Client application. This time is also transmitted by the Notes Server in the Server Annotation Response Data Structure.

The client then serializes the notes within the note buffer (step 154). After serialization of the note data, the client users the data in the buffer to construct a Client Annotation Event Data Structure (FIG. 10) and POSTs it to the Notes Server using the original URL provided by the user to retrieve the notes previously (step 156). The server validates the user name and password (step 158) and merges the note event information with the Notes Database 60 (FIG. 3) (step 160). The merge process includes checking whether or not the user has the required permission level to modify notes. Those notes, i.e. Note Events, that the user is not authorized to perform are ignored. Any new notes to be created, as indicated by a zero in the Note Serial Number field, are assigned a unique Note Serial Number. A new record is created in the Notes Database and the new note is placed in the record (step 162). A new record is also created in the Notes Table. The transaction is also recorded in the Notes Log Table (step 164).

Next, the Notes Server prepares a Server Annotation Response Data Structure filled with the new list of notes and their content (step 166). An important aspect of the invention is that the list of notes includes changes made by all concurrently active clients that have previously synchronized their notes with the Notes Server. In this fashion, the annotations associated with a particular document made by all other clients are replicated to each client at the time they perform note synchronization.

The Notes Server responds to the synchronizing client by transmitting the Server Annotation Response Data Structure to the client (step 168). Once received, the client merges the notes list with its local notes database (step 170). The display is then refreshed and the Notes Client is ready to receive and process input from the user once again (step 172).

Figure 9:
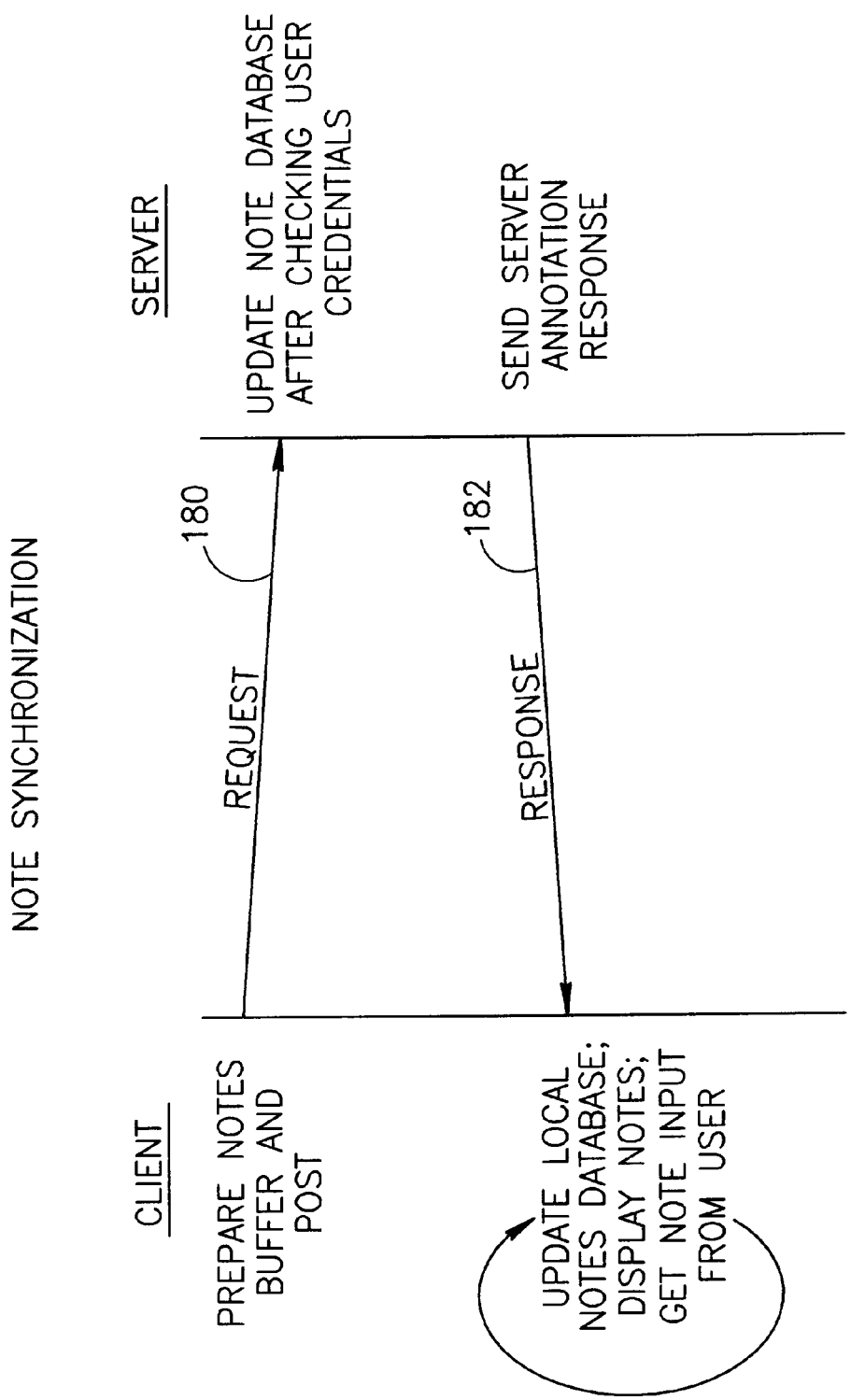
FIG. 9 is a message flow diagram illustrating the transaction sequence between client and server during note synchronization.

A message flow diagram illustrating the transaction sequence between client and server during note synchronization is shown in FIG. 9. As described previously, the synchronization process is initiated and driven by the user. Once initiated by the user, the client prepares a notes buffer with the notes to be processed by the Notes Server and POSTs. i.e., transmits, the buffer to the server (referenced 180). The notes are sent in the form of a Client Annotation Event Data Structure. The Notes Server, in response, update its Notes Database after authenticating the user. Any actions requested by the user that are not authorized due to lack of permissions, are ignored.

The actions are processed by the server and a response buffer is created. The buffer is sent to the client as a Server Annotation Response Data Structure (referenced 182). The client, upon receipt of the notes list, updates its local notes database, displays the notes in a frame in the web browser and inputs one or more notes commands from the user. The process is repeated while the user continues to create, edit and delete notes.

Client Annotation Event Data Structure

Figure 10:
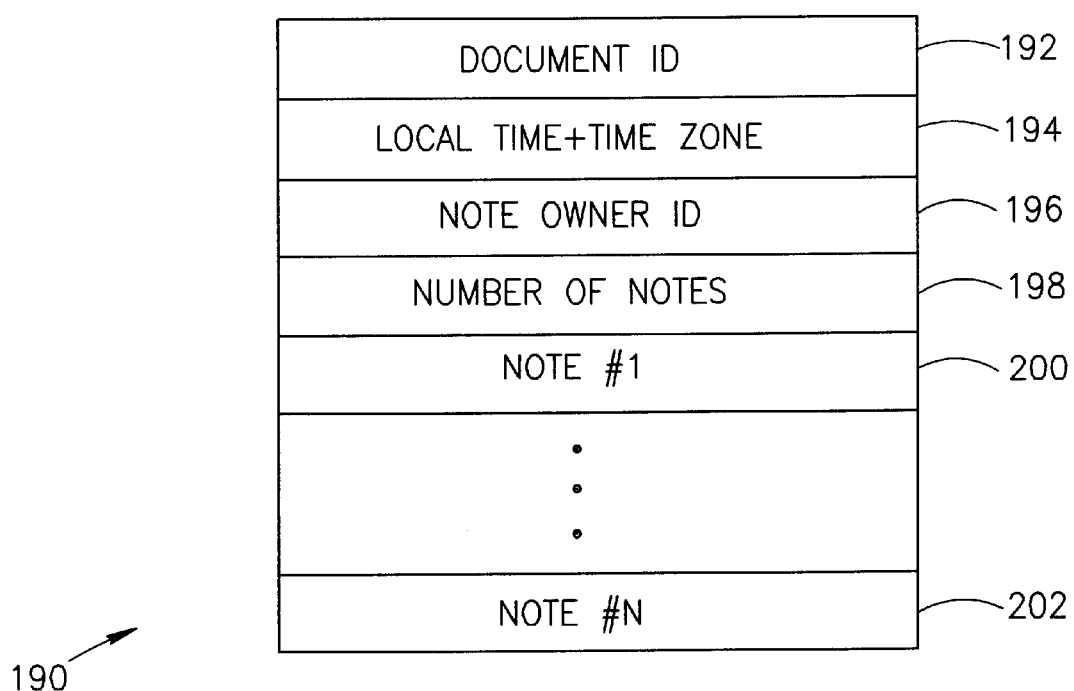
FIG. 10 is a diagram illustrating the Client Annotation Event Data Structure in more detail.
Figure 11:
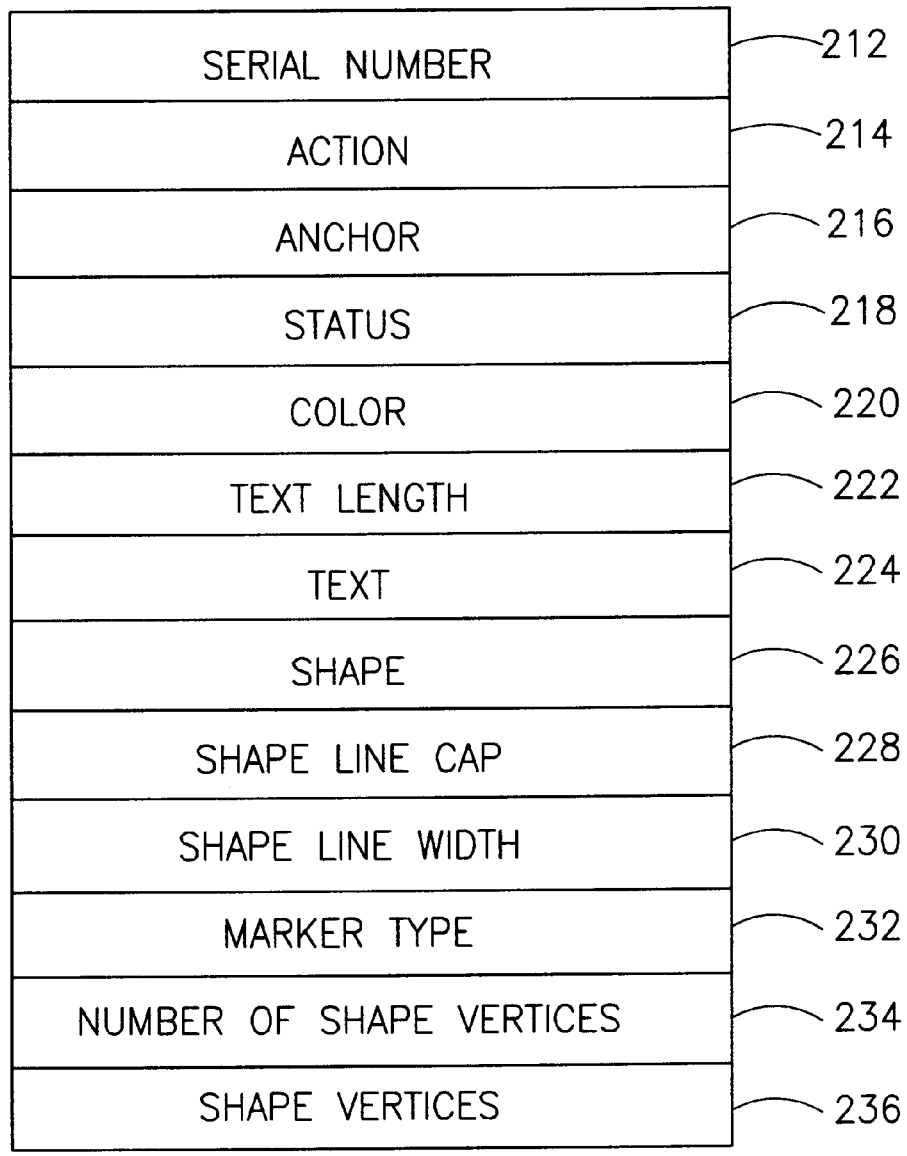
FIG. 11 is a diagram illustrating the note data structure of the Client Annotation Event Data Structure of FIG. 10 in more detail.

A diagram illustrating the Client Annotation Event Data Structure in more detail is shown in FIG. 10. The data structure, generally referenced 190, comprises a plurality of fields for conveying note data from the Notes Client to the Notes Server. The data structure 190 comprises a Document ID field 192 which comprises the URL of the annotated document the notes are associated with, local time 191 of the client along with the time zone of the client, the Note Owner ID 196 which uniquely identifies the user and the number of notes 198 contained in the message. Following the number of notes is a buffer containing one or more notes labeled note #1 200 through note #N 202.

A diagram illustrating the note data structure of the Client Annotation Event Data Structure of FIG. 10 in more detail is shown in FIG. 1. The data structure, generally referenced 210, comprises a plurality of fields that are used by the client to represent each note. Each note comprises a Note Serial Number 212 field uniquely identifying the note. The Note Serial number is set to zero for a new note and set to a non-zero value for an existing note. An action field 214 represents the action to be taken on the note. The following values are valid actions.

| 0 | No action |
| 1 | Add a note |
| 2 | Modify a note |
| 3 | Delete a note |
| 4 | Add a comment |
| 5 | Update status |

A note Anchor field 216 stores the coordinates of the position of the note in the document. The note status field 218 can have the following values.

| 0 | Ignore |
| 1 | To be performed |
| 2 | Done |

The note color field 220 represents the color the note is to be displayed in. The note color represents a RGB value.

The text length of the note 222 represents the number of bytes or characters of the next note itself. The note test field 224 represents a buffer with the actual text of the note. The note shape field 226 can have the following values.

| 0 | No shape |
| 1 | Polygon |
| 2 | Spline |
| 3 | Rectange |
| 4 | Ellipse |
| 5 | Marker |

A note shape line cap field 228 can have the following values.

| 0 | None |
| 1 | Right arrow |
| 2 | Left arrow |
| 3 | Both arrows |
| 4 | Round |
| 5 | Square |

The note shape line width field 230 represents the width of the shape line in millimeters. The note marker type field 232 represents the type of marker and can have the following values.

| 0 | No marker |
| 1 | Star |
| 2 | Circle |
| 3 | 'Approved' sign |
| 4 | 'Rejected' sign |
| 5 | 'Correct' sign |
| 6 | 'Remove' sign |

The number of shape vertices field 234 represents the number of points in the shape and the shape vertices 236 comprise a plurality of N (x, y) coordinates.

Server Annotation Response Data Structure

A diagram illustrating the Server Annotation Response Data Structure in more detail is shown in FIG. 12. The data structure, generally referenced 240, comprises a plurality of fields for conveying the note data from the Notes Server to the Notes Client. The data structure 240 comprises a Document ID field 242 which comprises the URL of the annotated document the notes are associated with, local server time 244, the dimensions of the document 246 including the width and height in millimeters and the resolution of the width and height in pixels per millimeter and the number of notes 248 contained in the message. Following the number of notes in a buffer containing one or more notes labeled note #1 250 through not #N 252.

Figure 13:
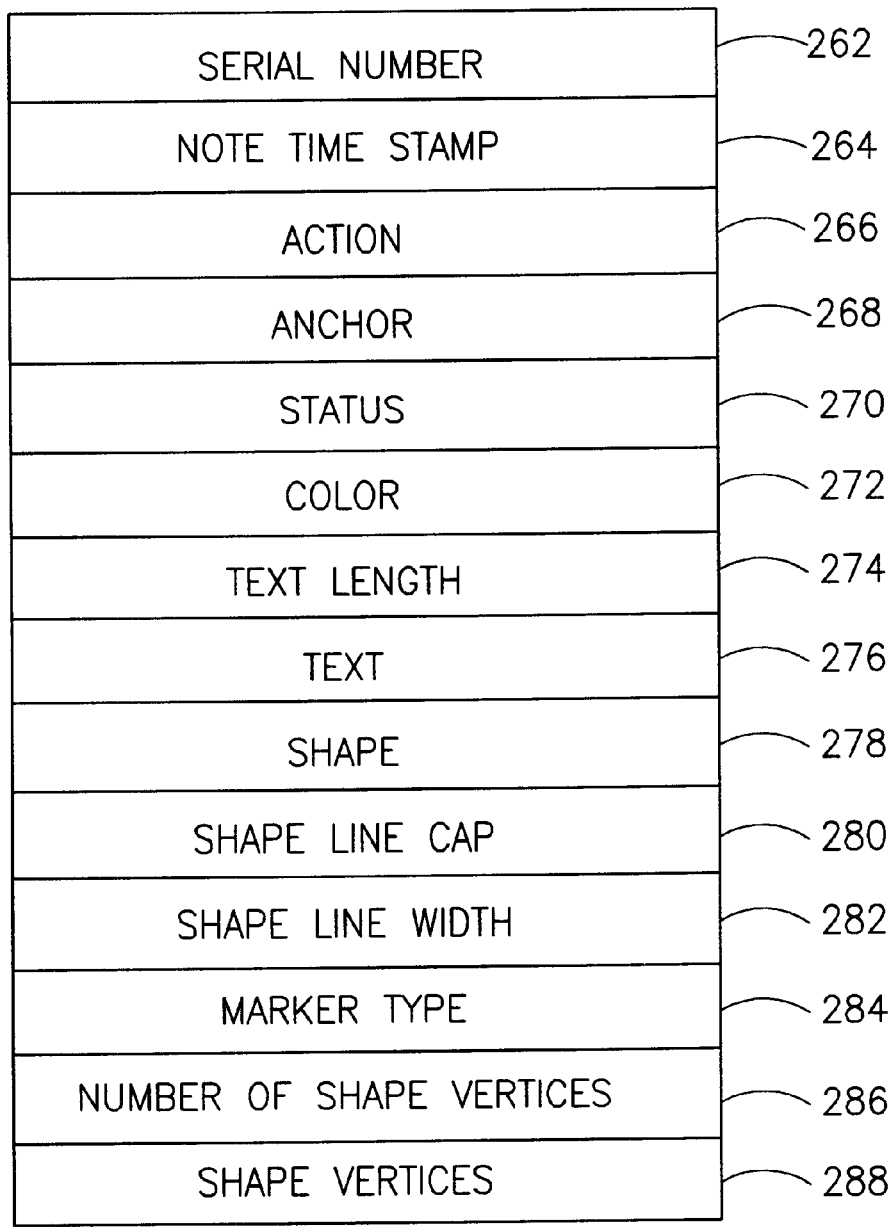
FIG. 13 is a diagram illustrating the note data structure of the Server Annotation Response Data Structure of FIG. 12 in more detail.

A diagram illustrating the note data structure of the Server Annotation Response Data Structure of FIG. 12 in more detail is shown in FIG. 13. The data structure, generally referenced 260, comprises a plurality of fields that are used by the server to represent each note. Each note comprises a Note Serial Number 262 field uniquely identifying the note. The Note Serial number is set to zero for a new note and set to a non-zero value for an existing note. The note Time Stamp field 264 represents the time (in server time) of the update for this particular note. An action field 266 represents the action to be taken on the note. The following values are valid actions.

| 0 | No action |
| 1 | Add a note |
| 2 | Modify a note |
| 3 | Delete a note |
| 4 | Add a comment |
| 5 | Update status |

A Note Anchor field 268 stores the coordinates of the position of the note in the document. The note status field 270 can have the following values.

| 0 | Ignore |
| 1 | To be performed |
| 2 | Done |

The note color field 272 represents the color the note is to be displayed in. The note color represents a RGB value.

The test length of the note 274 represents the number of bytes or characters of the text note itself. The note test field 276 represents a buffer with the actual text of the note. The note shape field 278 can have the following values.

| | |
|---|---|
| 0 | No shape |
| 1 | Polygon |
| 2 | Spline |
| 3 | Rectangle |
| 4 | Ellipse |
| 5 | Marker |

A note shape line cap field 280 can have the following values.

| | |
|---|---|
| 0 | None |
| 1 | Right arrow |
| 2 | Left arrow |
| 3 | Both arrows |
| 4 | Round |
| 5 | Square |

The note shape line width field 282 represents the width of the shape line in millimeters. The note marker type field 284 represents the type of marker and can have the following values.

| | |
|---|---|
| 0 | No marker |
| 1 | Star |
| 2 | Circle |
| 3 | 'Approved' sign |
| 4 | 'Rejected' sign |
| 5 | 'Correct' sign |
| 6 | 'Remove' sign |

The number of shape vertices field 286 represents the number of points in the shape and the shape vertices 288 comprise a plurality of N (X, Y) coordinates.

While the invention has been described with respect to a limited number of embodiments, it will be appreciated that many variations, modifications and other applications of the invention may be made.

What is claimed is:

1. A system for collaborative document annotation, comprising:

a document file and a notes database file located on one or more servers, said document file for storing one or more documents, said notes database for storing one or more notes, each note associated with a particular document;

one or more notes clients coupled to a network, each notes client operative to locally display a representation of a document remotely stored in said document file, each notes client adapted to enable a user to annotate said local version of said document with one or more notes, wherein any number of users in said network may simultaneously annotate their respective said local version of said document;

a notes server of said one or more servers being coupled to said network and operative to manage and maintain said notes database and to process and respond to notes events generated by said one or more notes clients; and synchronization means within each notes client and said notes server, wherein in response to a synchronization event initiated by one of said notes clients said synchronization means adapted to send notes events generated by said one of said notes clients to said notes server for merging with the contents of said notes database and to return to said one of said notes clients an updated notes list incorporating annotations previously made by all other notes clients that have synchronized with said notes server since synchronization between said one of said notes clients and said notes server was last performed.

2. The system according to claim 1, wherein said notes database comprises a Notes Table for storing the current content of a note.

3. The system according to claim 1, wherein said notes database comprises a Notes Log Table for storing a transaction history of all note events for notes associated with a particular document.

4. The system according to claim 1, said notes client comprises:

a display;

network communication means;

a processor suitably programmed to run;

a web browser; and a client note plug-in adapted to run within said web browser.

5. The system according to claim 1, wherein said network comprises the Internet.

6. The system according to claim 1, wherein said network comprises a TCP/IP based network.

7. The system according to claim 1, wherein said network comprises an Intranet.

8. The system according to claim 1, wherein said notes server comprises:

network communication means;

a process suitably programmed to:

provide web server services;

provide notes agent services; and provide document and notes browsing and synchronization services to said one or more notes clients.

9. The system according to claim 8, wherein said notes agent services comprises an Internet Server Application Programming Interface (ISAPI).

10. The system according to claim 1, further comprising a notes administrator for providing one or more Universal Resource Location (URL) aliases in managing and administrating said notes server.

11. The system according to claim 1, further comprising a note viewer for generating reports on the history of annotations on a per user or a per document basis that have occurred over a period of time.

12. The system according to claim 1, wherein two or more users can collaboratively work on the same document whereby each user is capable of viewing annotations made by the other users by synchronizing with said notes server.

13. The system according to claim 1, wherein a single page of a multipage document can be annotated on a notes client without requiring the entire multipage document to be transmitted to said notes client.

14. The system according to claim 1, further comprising security means for providing Universal Resource Locator (URL) translation and redirection services so as to provide user level security for documents and notes stored on said server.

15. The system according to claim 14, wherein said security means comprises a Document Location Table and a Client Access Key Table.

16. The system according to claim 1, wherein said document comprises an image.

17. The system according to claim 1, wherein said document is represented using a page description language.

18. The system according to claim 1, wherein said notes client is adapted to permit said user to annotate said document in parallel with the display of said document.

19. The system according to claim 1, wherein said document comprises a plurality of pages whereby each page can be annotated independently of all the other pages.

20. The system according to claim 1, wherein said synchronization means is user initiated.

21. The system according to claim 1, wherein said synchronization means is triggered by said notes server via the signaling of selected notes clients.

22. A method of collaborative document annotation, said method comprising the steps of:

receiving a first request comprising a Universal Resources Locator (URL) associated with a document to be viewed and annotated and transmitting said first request from a client to a server;

sending a first response from said server to said client in response to said first request, said first response comprising a document type and a representation of said requested document;

receiving a second request comprising a document note URL corresponding to the notes associated with said document and sending said second request from said client to said server;

sending a second response from said server to said client in response to said second request, said second response comprising one or more notes associated with said document;

displaying the representation of said document and the associated one or more notes locally on said client such that both are viewable simultaneously;

providing said user annotation editing functions on said client wherein any number of users in said network may simultaneously annotate their respective representations of said document and, in response to a synchronization event initiated by said client, generating a third request comprising one or more note events related to said document subsequently transmitted from said client to said server; and sending a third response from said server to said client in response to said third request, said third response comprising an updated list of notes associated with said document, said updated list of notes comprising the results of a merge between the note events sent in said third request and a notes database in communication with said server, said updated list of notes incorporating annotations previously made by all other clients that have synchronized with said server since synchronization between said client and said notes server was last performed.

23. The method according to claim 22, wherein said document type is a predetermined type regardless of what type of medium said document represents.

24. The method according to claim 22, wherein said step of getting a first request comprises the step of querying said user for a user name and password.

25. The method according to claim 22, wherein said step of sending a first response comprises the step of authenticating said user on said server before sending said first response.

26. The method according to claim 22, further comprising the step of getting a fourth request comprising a folder URL associated with the folder comprising one or more documents to be viewed and annotated and transmitting said fourth request from said client to said server.

27. The method according to claim 22, further comprising the step of sending a fourth response from said server in response to receiving a request comprising a folder URL, said fourth response comprising a directory listing of said folder.

28. The method according to claim 22, wherein said document comprises an image.

29. The method according to claim 22, wherein said document is represented using a page description language.

30. The method according to claim 22, wherein said step of permitting said user to perform annotation functions on said notes client occurs simultaneously with the display of said document.

31. The method according to claim 22, wherein said document comprises a plurality of pages whereby each page is capable of being annotated independently of all the other pages.

32. The method according to claim 22, wherein said steps of generating a third request and receiving a third response is initiated by said user.

33. The method according to claim 22, wherein said steps of generating a third request and receiving a third response is initiated by said server via the signaling of each selected client.

34. The system according to claim 17, wherein said page description language is portable document format or PDF.

35. The method according to claim 29, wherein said page description language is portable document format or PDF.

36. The system according to claim 1, wherein said synchronization means within said notes server, in response to a synchronization event involving one of said notes clients, alerts others of said notes clients of said synchronization event.

37. The system according to claim 36, wherein said synchronization means within said notes server alerts said others of said notes clients by initiating transmission of an electronic mail or e-mail message to said other of said notes clients.

38. The system according to claim 36, wherein said synchronization means alerts only notes clients that have elected to be alerted of synchronization events and does not alert notes clients that have not elected to be alerted of synchronization events.

39. The method according to claim 22, further comprising the step of said server, in response to said third request, alerting clients other than said client from which said third request was received that said note event was transmitted from said client to said server.

40. The method according to claim 39, wherein said server alerts said clients by initiating transmission of an electronic mail or e-mail message.

41. The method according to claim 39, wherein said server alerts means alerts only clients that have elected to be alerted of synchronization events and does not alert clients that have not elected to be alerted of synchronization events.

42. The system according to claim 1, wherein each notes client receives from said notes server an indication of a type associated with said document, said type being a predetermined type regardless of what type of medium said document represents.

43. The system according to claim 42, wherein said indication of a type is a Multipurpose Internet Mail extension (MIME).

44. The method according to claim 23, wherein said type is indicated by a Multipurpose Internet Mail Extension (MIME).

45. A system for collaborative document annotation, comprising:

one or more servers, coupled to a first network;

a document file system located on at least one of said servers, said document file system for storing document files, said document files describing document pages;

a notes database located on at least one of said servers, said notes database for storing one or more notes, each note associated with a particular one of said document pages;

one or more notes clients coupled to a second network, each notes client operative to locally generate a display of a document page, described by one of said document files, said notes client adapted to permit a user to annotate said document page with one or more user notes, said notes client operative to generate note events describing user notes, wherein any number of users in said network may simultaneously annotate their respective said document page;

a notes server of said one more servers being coupled to said second network, said notes server operative to receive one or more note events processed by one of said notes clients; and synchronization means within each notes client and said notes server, wherein in response to a synchronization event initiated by one of said notes clients said synchronization means adapted to update said notes server with any notes events processed by said one of said notes clients and to return to said one of said notes clients an updated notes list incorporating annotations previously made by all other notes clients that have synchronized with said notes server since synchronization between said one of said notes clients and said notes server was last performed.

46. The system according to claim 45, wherein said notes database comprises a Notes Table for storing the current content of an archived note.

47. The system according to claim 45, wherein said notes database comprises a Notes Log Table for storing a transaction history of all note events for notes associated with a particular document file.

48. The system according to claim 45, wherein said notes client comprises:

a display;

network communication means;

a processor suitably programmed to run;

a web browser; and a client note plug-in adapted to run within said web browser.

49. The system according to claim 45, wherein said second network comprises the Internet. (previously added) (New) The system according to claim 45, wherein said second network comprises a TCP/IP based network.

50. The system according to claim 45, wherein said second network comprises a TCP/IP based network.

51. The system according to claim 45, wherein said second network comprises an Intranet.

52. The system according to claim 45, wherein said notes server comprises:

network communication means;

a processor suitably programmed to:

provide web server services;

provide notes agent services;

provide document and notes browsing and synchronization services to said one or more notes clients.

53. The system according to claim 52, wherein said notes agent services comprises an Internet Server Application Programming Interface (ISAPI).

54. The system according to claim 45, further comprising a notes administrator for providing one or more Universal Resource Location (URL) aliases in managing and administrating said notes server.

55. The system according to claim 45, further comprising a note viewer for generating reports on the history of annotations on a per user or a per document file basis that have occurred over a period of time.

56. The system according to claim 45, wherein two or more users can collaboratively work on the same document file whereby each user is capable of viewing notes made by the other uses upon synchronization with said notes server.

57. The system according to claim 45, wherein a document page can be annotated on a notes client without requiring the entire document file to be transmitted to said notes client.

58. The system according to claim 45, further comprising security means for providing Universal Resource Locator (URL) translation and redirection services so as to provide user level security for documents and notes stored on said servers.

59. The system according to claim 58, wherein said security means comprises a Document Location Table and a Client Access Key Table.

60. The system according to claim 45, wherein said document page comprises an image.

61. The system according to claim 45, wherein said document page is represented in said document file using a page description language.

62. The system according to claim 45, wherein said notes client is adapted to permit said user to annotate said document page in parallel with the display of said document page.

63. The system according to claim 45, wherein said document file comprises a plurality of document pages, whereby each document page is able to be annotated independently of all the other document pages.

64. The system according to claim 45, wherein said synchronization means is user initiated.

65. The system according to claim 45, wherein said synchronization means is triggered by said notes server via signaling of selected notes clients.

66. The system according to claim 61, wherein said page description language is portable document formal or PDF.

67. The system according to claim 45, wherein said synchronization means within said notes server, in response to a synchronization event involving one of said notes clients, alerts others of said notes clients of said synchronization event.

68. The system according to claim 67, wherein said synchronization means within said notes server alerts said others of said notes clients by initiating transmission of an electronic mail or e-mail message to said others of said notes clients.

69. The system according to claim 67, wherein said synchronization means alerts only notes clients that have elected to be alerted of synchronization events and does not alert notes clients that have not elected to be alerted of synchronization events.

70. The system according to claim 45, wherein each notes client receives from said notes an indication of a type associated with said document file, said type being a predetermined type regardless of what type of medium said document file represents.

71. The system according to claim 70, wherein said indication of a type is a Multipurpose Internet Mail Extension (MIME).

72. The system according to claim 54, wherein said Universal Resource Location (URL) aliases are composed of document file location within said document file system.

73. A system for collaborative document annotation, comprising:

one or more servers coupled to a first network;

a document file system located on at least one of said servers, said document file system for storing document files, each stored document file describing one or more document pages in a format defined by a native type associated with the document file;

a notes database located on at least one of said servers, said notes database for storing one or more archived notes, each archived note associated with a particular one of said document pages;

one or more notes clients coupled to a second network, each notes client operative to locally generate a display of a document page described by one of said document files, said notes client adapted to permit a user to annotate said document page with one or more suer notes, said notes client operative to simultaneously display said archived nots associated with said document page and said user notes over said display of a document page such that said document page is viewable along with both said associated archived notes and said user notes, wherein any number of users in said network may simultaneously annotate their respective said document pages; and a notes server of said one or more servers being coupled to said second network and operative to maintain said notes database; and synchronization means operative to send one or more notes events from a synchronizing notes clients to said notes server, merge said notes events with the notes stored in said notes database associated with a particular document, and to send an updated notes list to said synchronizing notes client, wherein said updated notes list is generated by merging said one or more notes event with notes stored in said notes database associated with said particular document, and comprises annotations previously made by all other notes clients that have synchronized with said notes server since synchronization between said one of said notes clients and said notes server was last performed.

74. The system according to claim 73, wherein said notes client comprises:

a display;

network communication means for communicating data via a network;

a processor suitably programmed to run;

a web browser; and a client note plug-in adapted to run within said web browser.

75. The system according to claim 73, wherein said second network comprises the internet.

76. The system according to claim 73, wherein said second network comprises a TCP/IP based network.

77. The system according to claim 73, wherein said second network comprises an Intranet.

78. The system according to claim 73, wherein said notes server comprises:

network communication means for communicating data via a network;

a processor suitably programmed to:

provide web server services;

provide notes agent services;

provide document and notes browsing and synchronization services to said one or more notes clients.

79. The system according to claim 73, further comprising a notes administrator for providing one or more Universal Resource Location (URL) aliases in managing and administrating said notes server.

80. The system according to claim 73, wherein two or more users can collaboratively work on the same document file whereby each user is capable of viewing notes made by the other users upon synchronization with said notes server.

81. The system according to claim 73, wherein a document page can be annotated on a notes client without requiring the entire document file to be transmitted to said notes client.

82. The system according to claim 73, further comprising security means for providing Universal Resource Locator (URL) translation and redirection services so as to provide user level security for documents and notes stored on said servers.

83. The system according to claim 73, wherein said document page comprises an image.

84. The system according to claim 73, wherein said document page is represented in said document file using a page description language.

85. The system according to claim 73, wherein said notes client is adapted to permit said user to annotate said document page in parallel with the display of said document page.

86. The system according to claim 84, wherein said page description language is portable document format or PDF.

87. The system according to claim 73, wherein said indication of a type is a Multipurpose Internet Mail Extension (MIME).

88. The system according to claim 79, wherein said Universal Resource Location (URL) aliases are composed of document file location within said document file system.

89. The system according to claim 1, wherein said notes clients perform synchronization events with said notes server a synchronously with respect to each other.

90. The system according to claim 45, wherein said notes clients perform synchronization events with said notes server asynchronously with respect to each other.

91. The system according to claim 73, wherein said notes clients perform synchronization events with said notes server asynchronously with respect to each other.

92. A method of collaborative document annotation in a system including one or more notes clients and a notes server, said method comprising the steps of:

displaying a representation of a document and associated notes on one of said notes clients;

generating one or more notes events in accordance with user annotations of said document, wherein any number of users in said network may simultaneously annotate their respective representations of said document;

synchronizing said one of said notes clients with said notes server wherein said one or more notes events are sent from said one of said notes clients to said notes server, merged with a current notes list maintained by said notes server and an updated notes list is sent from said notes server to said one of said notes clients; and wherein said updated notes list incorporates annotations previously made by all other notes clients that have synchronized with said notes server since synchronization between said one of said notes clients and said notes server was last performed.

93. The method according to claim 92, wherein said notes clients perform synchronization events with said notes server asynchronously with respect to each other.

94. A method of collaborative document annotation for use on a notes server in a system including one or more notes clients, said method comprising the steps of:
- first receiving a request to view a document and in response thereto sending requested document data to a notes client;
- second receiving a request to retrieve notes associated with said document and in response thereto sending requested annotation data to said notes client;
- third receiving one or more notes events associated with said document from said notes client in response to a synchronization event and in response, merging said one or more notes events with a current set of notes stored in a notes database and associated with said document, generating an updated notes list therefrom and sending said updated notes list to said notes client; and
- wherein said updated notes list incorporates annotations previously made by all other notes clients that have synchronized with said notes server since synchronization between said one of said notes clients and said notes server was last performed.

95. The method according to claim 94, wherein synchronization events between said notes clients and said notes server occur asynchronously with respect to each other.

96. A computer program product for use in a notes server, said computer program product comprising:
- a computer useable medium having computer readable program code means embodied in said medium for performing collaboration annotation of documents, said computer program product comprising:
- computer readable program code means for receiving a request to retrieve notes associated with a document and in response thereto sending requested annotation data to a notes client;
- computer readable program code means for receiving one or more notes events associated with said document from said notes client in response to a synchronization event; and
- computer readable program code means for merging said one or more notes events with a current set of notes stored in a notes database and associated with said document, generating an updated notes list therefrom and sending said updated notes list to said notes client in response to said synchronization event, and wherein said updated notes list incorporates annotations previously made by all other notes clients that have synchronized with said notes server since synchronization between said one of said notes clients and said notes server was last performed.

* * * * *